(12) United States Patent
Hirano

(10) Patent No.: US 9,811,736 B2
(45) Date of Patent: Nov. 7, 2017

(54) INFORMATION PROCESSING DEVICE, INFORMATION PROCESSING METHOD, INFORMATION PROCESSING DEVICE PROGRAM, AND RECORDING MEDIUM

(71) Applicant: Rakuten, Inc., Tokyo (JP)

(72) Inventor: Hiromi Hirano, Tokyo (JP)

(73) Assignee: Rakuten, Inc., Tokyo (JP)

( * ) Notice: Subject to any disclaimer, the term of this patent is extended or adjusted under 35 U.S.C. 154(b) by 143 days.

(21) Appl. No.: 14/392,271

(22) PCT Filed: Jun. 28, 2013

(86) PCT No.: PCT/JP2013/067812
§ 371 (c)(1),
(2) Date: Mar. 3, 2016

(87) PCT Pub. No.: WO2014/207892
PCT Pub. Date: Dec. 31, 2014

(65) Prior Publication Data
US 2016/0188978 A1    Jun. 30, 2016

(51) Int. Cl.
*G06K 9/00* (2006.01)
*G06K 9/46* (2006.01)
(Continued)

(52) U.S. Cl.
CPC ....... *G06K 9/00744* (2013.01); *G06K 9/4652* (2013.01); *G06T 7/20* (2013.01);
(Continued)

(58) Field of Classification Search
USPC ........ 382/100, 103, 106–107, 155, 162–168, 382/173, 181, 189, 209, 219, 232, 254,
(Continued)

(56) References Cited

U.S. PATENT DOCUMENTS 8,160,370 B2 * 4/2012 Liu .................. G06T 7/207
348/169
2009/0175500 A1 * 7/2009 Kizuki ................ G06T 7/277
382/103
(Continued)

FOREIGN PATENT DOCUMENTS

JP    2006-318345 A    11/2006
JP    2007-257333 A    10/2007
(Continued)

OTHER PUBLICATIONS

International Search Report of PCT/JP2013/067812 dated Aug. 6, 2013.

*Primary Examiner* — Seyed Azarian
(74) *Attorney, Agent, or Firm* — Sughrue Mion, PLLC

(57) ABSTRACT

An information processing method includes: acquiring setting pseudo multipole information on a pseudo multipole (S10), the setting pseudo multipole information being set such that color information on poles p1 and p2 is related to color information on an object 2, the poles corresponding to a plurality of points in an image of a single predetermined frame 20; specifying a position of the pseudo multipole in an initial frame and seeking an image of a single frame in the video for the pseudo multipole (S14), the pseudo multipole having poles whose colors conform to colors in the color information on the poles in the acquired setting pseudo multipole information, a distance between the poles of the pseudo multipole being equal to or less than a predetermined distance; specifying a position of the found pseudo multipole in the image of the single frame of the video (S17); and tracking the object on the basis of the position of the pseudo multipole found from the image of the single frame and the
(Continued)

position of the pseudo multipole found from an image of a frame preceding the single frame in a reproduction direction of the video (S18).

12 Claims, 21 Drawing Sheets

(51) Int. Cl.
*G06T 7/20* (2017.01)
*G06T 7/277* (2017.01)
*H04N 7/18* (2006.01)

(52) U.S. Cl.
CPC .... *G06T 7/277* (2017.01); *G06T 2207/10016* (2013.01); *G06T 2207/10024* (2013.01)

(58) Field of Classification Search
USPC ............... 382/274, 276, 286–298, 305, 312; 348/157, 169
See application file for complete search history.

(56) References Cited

U.S. PATENT DOCUMENTS

| | | | | |
|---|---|---|---|---|
| 2010/0150401 | A1* | 6/2010 | Kizuki | G06T 7/277 382/103 |
| 2010/0296697 | A1* | 11/2010 | Ikenoue | G06T 7/277 382/103 |
| 2013/0235208 | A1* | 9/2013 | Hirano | G06T 7/20 348/157 |

FOREIGN PATENT DOCUMENTS

| | | |
|---|---|---|
| JP | 2010-147560 A | 7/2010 |
| JP | 2013-77073 A | 4/2013 |

* cited by examiner

| PSEUDO MULTIPOLE NUMBER | COLOR INFORMATION ON FIRST POLE | COLOR INFORMATION ON SECOND POLE |
|---|---|---|
| 001 | 0xe0e8b5 | 0x6f9e96 |
| 002 | 0xf3f9bd | 0x679883 |
| 003 | 0xe5f0a2 | 0x50aba4 |
| 004 | 0xd4edac | 0x46a6a5 |
| 005 | 0xf3f9bd | 0x37636e |
| 006 | 0x90a87 | 0x36626d |
| 007 | 0xe0f7bf | 0x25351 |

| r | 4, 6, 9, 12, 16 |
|---|---|

INFORMATION PROCESSING DEVICE, INFORMATION PROCESSING METHOD, INFORMATION PROCESSING DEVICE PROGRAM, AND RECORDING MEDIUM

CROSS REFERENCE TO RELATED APPLICATIONS

This application is a National Stage of International Application No.: PCT/JP2013/067812 filed Jun. 28, 2013, the contents of which are incorporated herein by reference in their entirety.

TECHNICAL FIELD

The present invention relates to an information processing device that subjects video data to information processing, an information processing method, a program for an information processing device, and a recording medium.

BACKGROUND ART

Particle filters are a conventionally-known technique for tracking a specific object in a video. For example, Patent Document 1 discloses a target tracking device configured to be able to perform highly precise tracking precision even when an apparent color changes.

CITATION LIST

Patent Document

Patent Document 1: Japanese Patent Application Laid-Open No. 2010-147560

SUMMARY OF THE INVENTION

Problem to be Solved by the Invention

In the technique disclosed in Patent Document 1, however, when pixels whose colors are similar to the color of an object appear outside the object, such as when a background having a similar color appears, a particle may emerge in an area distant from the object, resulting in lowering of tracking precision.

The present invention has been made in light of such problems, and an exemplary object of the present invention is to provide, for example, an information processing device capable of tracking a specific object in a video with high precision.

Means for Solving the Problem

In order to solve the problem, the invention according to claim 1 is an information processing device that tracks a predetermined object in a video h having a plurality of frames, and the information processing device includes: a setting pseudo multipole information acquisition means that acquires setting pseudo multipole information on a pseudo multipole, the setting pseudo multipole information being set such that color information on poles is related to color information on the object, the poles corresponding to a plurality of points in an image of a single predetermined frame; an initial position specifying means that specifies a position of the pseudo multipole in an initial frame; a seeking means that seeks the pseudo multipole in an image of a single frame in the video, the pseudo multipole having poles whose colors conform to colors in the color information on the poles in the acquired setting pseudo multipole information, a distance between the poles of the pseudo multipole being equal to or less than a predetermined distance; a position specifying means that specifies a position of the sought pseudo multipole in the image of the single frame of the video; and an object tracking means that tracks the object on the basis of the position of the pseudo multipole in the image of the single frame which the position specifying means has specified and the position of the pseudo multipole in an image of a frame preceding the single frame in a reproduction direction of the video which the initial position specifying means or the position specifying means has specified.

Therefore, even if a pixel having a similar color appears the outside of the object, the tracking precision is improved because of tracking the object by using the pseudo multipole which has color information and in which the poles are disposed at a limited distance.

The invention according to claim 2 is the information processing device according to claim 1, wherein the seeking means seeks the pseudo multipole in the image of the single frame in the video, the pseudo multipole having poles whose colors are similar to colors in color information on the poles in the acquired setting pseudo multipole information, a distance between the poles of the pseudo multipole being equal to or less than a predetermined distance.

In this case, since the information processing device seeks poles whose colors are similar to the colors in the color information on the poles in the setting pseudo multipole information that has been acquired in advance, the positions of the poles are less likely to disperse, and thus the tracking precision is improved.

The invention according to claim 3 is the information processing device according to claim 1 or claim 2, and the information processing device further includes a seeking range setting means that sets a seeking range in which the seeking means seeks the pseudo multipole depending on the position of the pseudo multipole in the frame preceding the single frame in the reproduction direction of the video.

In this case, since the seeking range is set within a limited area, such as within an area in the vicinity of the pseudo multipole in the preceding frame in the reproduction direction of the video, it is possible to track the object accurately and swiftly.

The invention according to claim 4 is the information processing device according to claim 3, wherein the seeking range setting means sets the seeking range that is larger than an identification range having a predetermined size which is used to specify the position of the object in the preceding frame.

In this case, even if the size of the object in the image is varied by being zoomed in or out, it is possible to track the object accurately.

The invention according to claim 5 is the information processing device according to any one of claim 1 to claim 4, and the information processing device further includes a color information recommending means that, in setting the setting pseudo multipole information, recommends color information on a remaining one of the poles when color information on a predetermined one of the poles has been set.

In this case, after having set the color information on a specific pole in the pseudo multipole, a user can easily set the color information on a remaining pole.

The invention according to claim 6 is the information processing device according to claim 5, wherein the color information recommending means recommends the color information on the remaining pole on the basis of information concerning the object.

In this case, the color information that enables an improvement in the tracking performance can be easily presented.

The invention according to claim 7 is the information processing device according to any one of claim 1 to claim 6, and the information processing device further includes a pseudo multipole recommending means that, in setting the setting pseudo multipole information, recommends another pseudo multipole after the at least one pseudo multipole has been set.

In this case, for example, for a pseudo multipole that a user has selected from an image and has set, the information processing device can recommend many other pseudo multipoles required to set pseudo multipoles that a user has selected from an image. Therefore, many pseudo multipoles can be set in accordance with a user's selection so as to improve the tracking precision.

The invention according to claim 8 is the information processing device according to any one of claim 1 to claim 7, wherein the object tracking means tracks the object on the basis of positions of the plurality of pseudo multipoles sought.

In this case, it is possible to specify the position of the object more correctly.

The invention according to claim 9 is the information processing device according to any one of claim 1 to claim 8, wherein the number of the poles of the pseudo multipole is three or more.

In this case, it is possible to support the case of multiple colors, such as striped patterns.

The invention according to claim 10 is the information processing device according to claim 9, wherein when the seeking means fails to seek all the poles of the pseudo multipole, the seeking means finds the pseudo multipole by estimating, from a sought one of the poles, a position of another one of the poles, on the basis of a positional relationship between the poles.

In this case, even if an object is partially hidden and a part of the poles of the pseudo multipoles is thereby hidden, it is possible to track the object by using the pseudo multipoles.

The invention according to claim 11 is the information processing device according to any one of claim 1 to claim 10, wherein the seeking means seeks the pseudo multipole in which a color value in a point located between the poles is different from color values of all the poles by a predetermined value or more.

In this case, even if multipoles have similar colors, it is possible to seek the pseudo multipole accurately.

The invention according to claim 12 is an information processing method for tracking a predetermined object in a video having a plurality of frames, and the method includes: a setting pseudo multipole information acquisition step of acquiring setting pseudo multipole information on a pseudo multipole, the setting pseudo multipole information being set such that color information on poles is related to color information on the object, the poles corresponding to a plurality of points in an image of a single predetermined frame; an initial position specifying step of specifying a position of the pseudo multipole in an initial frame; a seeking step of seeking an image of a single frame in the video for the pseudo multipole, the pseudo multipole having poles whose colors conform to colors in the color information on the poles in the acquired setting pseudo multipole information, a distance between the poles of the pseudo multipole being equal to or less than a predetermined distance; a position specifying step of specifying a position of the sought pseudo multipole in the image of the single frame of the video; and an object tracking step of tracking the object on the basis of the position of the pseudo multipole in the image of the single frame which has been specified at the position specifying step and the position of the pseudo multipole in an image of a frame preceding the single frame in a reproduction direction of the video which has been specified at the initial position specifying step or at the position specifying step.

The invention according to claim 13 is a program for an information processing device that tracks a predetermined object in a video having a plurality of frames, and the program causes a computer to function as: a setting pseudo multipole information acquisition means that acquires setting pseudo multipole information on a pseudo multipole, the setting pseudo multipole information being set such that color information on poles is related to color information on the object, the poles corresponding to a plurality of points in an image of a single predetermined frame; an initial position specifying means that specifies a position of the pseudo multipole in an initial frame; a seeking means that seeks, in an image of a single frame in the video for the pseudo multipole, the pseudo multipole having poles whose colors conform to colors in the color information on the poles in the acquired setting pseudo multipole information, a distance between the poles of the pseudo multipole being equal to or less than a predetermined distance; a position specifying means that specifies a position of the sought pseudo multipole in the image of the single frame of the video; and an object tracking means that tracks the object on the basis of the position of the pseudo multipole in the image of the single frame which the position specifying means has specified and the position of the pseudo multipole in an image of a frame preceding the single frame in a reproduction direction of the video which the initial position specifying means or the position specifying means has specified.

Effect of the Invention

According to the present invention, even if a pixel having a similar color appears the outside of an object, since the object is tracked by using a pseudo multipole which has color information and in which poles are disposed at a limited distance, it is possible to track a specific object in a video with high precision.

MODES FOR CARRYING OUT THE INVENTION

Some embodiments of the present invention will be described below with reference to the accompanying drawings. In embodiments described below, the present invention is applied to an information processing device.

1. Schematic Configuration and Function of Information Processing Device

First, a description will be given of a schematic configuration and function of an information processing device according to one embodiment of the present invention, using FIG. 1 to FIG. 4.

Figure 1:
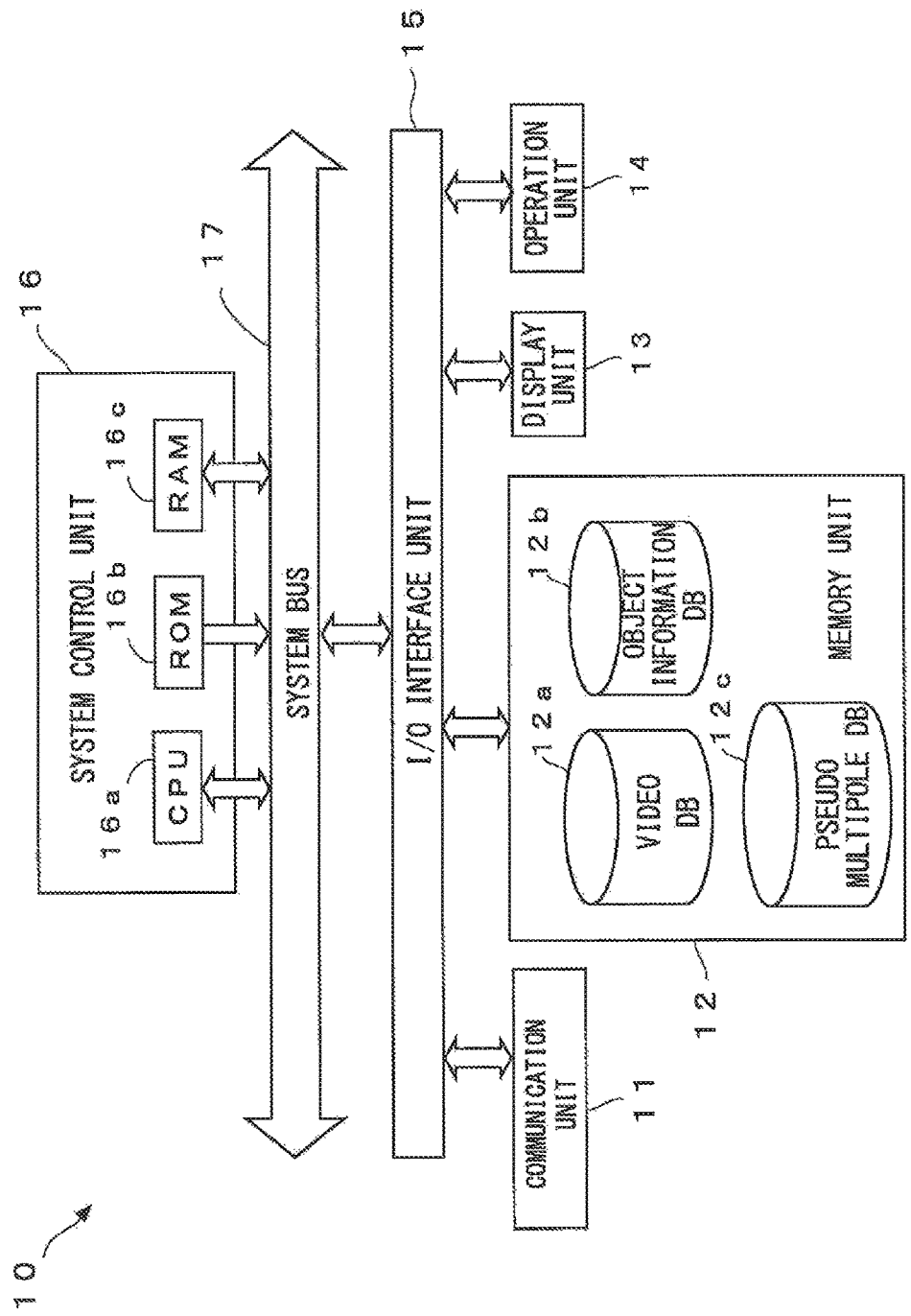
FIG. 1 is a block diagram illustrating an exemplary schematic configuration of an information processing device according to an embodiment of the present invention.
Figures 2, 3, 4:
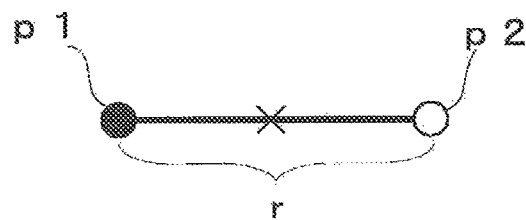
FIG. 2 is a schematic view illustrating an exemplary pseudo dipole.
FIG. 3 is a schematic view illustrating exemplary data stored in the pseudo multipole database of FIG. 1.
FIG. 4 is a schematic view illustrating exemplary data stored in the pseudo multipole database of FIG. 1.

FIG. 1 is a block diagram illustrating an exemplary schematic configuration of an information processing device 10 according to this embodiment. FIG. 2 is a schematic view illustrating an exemplary pseudo dipole. FIG. 3 is a schematic view illustrating exemplary data stored in a pseudo multipole database. FIG. 4 is a schematic view illustrating exemplary data stored in the pseudo multipole database.

As illustrated in FIG. 1, an information processing device 10 functions as a computer and includes a communication unit 11, a memory unit 12, a display unit 13, an operation unit 14, an I/O interface unit 15, and a system control unit 16. The system control unit 16 is connected to the I/O interface unit 15 via a system bus 17.

The information processing device 10 subjects video data to information processing. For example, the information processing device 10 receives image data concerning, for example, the broadcast of a horse race from a horse race site (not illustrated) via a network (not illustrated). Then, the information processing device 10 subjects the received video data to information processing and transmits the video data that has undergone the information processing to a user's terminal device (not illustrated). Incidentally, the display unit 13 in the information processing device 10 may act as a user's terminal device and display the video data that has undergone the information processing.

When the information processing device 10 is connected to a network or a local area network, the communication unit 11 controls a communication status and transmits/receives data. The information processing device 10 receives image data concerning, for example, the broadcast of a horse race from a horse race site via the communication unit 11.

The memory unit 12 is an example of a storage means and may be implemented using a hard disk drive, for example. This memory unit 12 stores video data, a variety of programs including an operating system and a server program, and the like. For example, these programs may be acquired from another server device or other devices via a network or may be stored in a recording medium and read therefrom via a drive device (not illustrated).

As described above, the recording medium functions as an example of a recording medium in which a program for an information processing device is stored in a computer-readable manner. The program for an information processing device that tracks a predetermined object in a video having a plurality of frames causes a computer to function as a setting pseudo multipole information acquisition means, an initial position specifying means, a seeking means, a position specifying means, and an object tracking means. The setting pseudo multipole information acquisition means acquires setting pseudo multipole information on a pseudo multipole. The setting pseudo multipole information is set such that color information on poles is related to color information on the object. The poles correspond to a plurality of points in an image of a single predetermined frame. The initial position specifying means specifies a position of the pseudo multipole in an initial frame. The seeking means seeks an image of a single frame in the video for the pseudo multipole. The pseudo multipole has poles whose colors conform to colors in the color information on the poles in the acquired setting pseudo multipole information. A distance between the poles of the pseudo multipole is equal to or less than a predetermined distance. The position specifying means specifies a position of the sought pseudo multipole in the image of the single frame of the video. The object tracking means tracks the object on the basis of the position of the pseudo multipole in the image of the single frame which the position specifying means has specified and the position of the pseudo multipole in an image of a frame preceding the single frame in a reproduction direction of the video which the initial position specifying means or the position specifying means has specified.

The memory unit 12 is equipped with, for example: a video database 12a (referred to below as a "video DB 12a"), which stores video data on, for example, a filmed horse race or temporarily stores video data on the broadcast of a horse race: an object information database 12b (referred to below as an "object information DB 12b"), which stores information regarding an object: and a pseudo multipole database 12c (referred to below as a "pseudo multipole DB 12c"), which stores pseudo multipoles for use in tracking an object.

Herein, a pseudo multipole is a multipole to which color information on the poles and a positional relationship between the poles are set. For example, as illustrated in FIG. 2, in case of a pseudo dipole as an example of a pseudo multipole, predetermined colors are set to a first pole p1 and a second pole p2, and the distance between the first pole p1 and the second pole p2 is set as a distance r. Incidentally, pseudo multipoles are set to a predetermined image, and why such multipoles are called pseudo multipoles is that an interaction, such as an electromagnetic interference, does not arise between predetermined images.

The video DB 12a stores video data on past horse races. In addition, the video DB 12a temporarily stores video data on the broadcast of a live race.

The object information DB 12b stores information on the helmet and the racing uniform of a jockey riding on a horse in case of a horse race as the color information on an object in relation to a race number and a horse number. In case of the horse race, the object may be the combination of the helmet and the racing uniform of the jockey, for example. Incidentally, the object may be the combination of the helmet of the jockey and the outfit of the horse.

The pseudo multipole DB 12c stores the color information on poles corresponding to a predetermined number of pseudo multipoles, as illustrated in FIG. 3. The pseudo multipole DB 12c stores the color information on poles (e.g., RGB information indicating the colors of poles) in relation to pseudo multipole numbers. Incidentally, the color information may be in any format, such as an RGB or HSV format, in which poles' colors can be set. In this way, color information on poles is set to track the object, as setting pseudo multipole information, such that the color information on poles are related to color information on an object.

The expression "the color information on poles is set . . . such that the color information on poles are related to the color information on an object" means that if the helmet and the racing uniform of a jockey is regarded as a part of an object, for example, the color information on poles is set so as to be related to the colors of the helmet and the racing uniform respectively, as illustrated in FIG. 3. The expression "poles corresponding to a plurality of points in a frame image" means that the coordinates of poles in the frame image are not yet determined when pseudo multipoles are set but correspond to predetermined points therein when the pseudo multipoles are sought.

As illustrated in FIG. 4, the pseudo multipole DB 12c stores information regarding pole-inter-distances r between the poles of pseudo dipoles (exemplary distances between poles). As illustrated in FIG. 4, pole-inter-distances r are set in a discrete manner, as a plurality of predetermined values as an example of that poles are disposed at a predetermined distance or less. In this way, pole-inter-information indicating that the poles of a pseudo multipole are disposed at a predetermined distance or less is preset. Incidentally, the pole-inter-information indicating that the poles of a pseudo multipole are disposed at a predetermined distance or less is common information shared by pseudo multipoles to be sought.

Setting pseudo multipole information and pole-inter-information are preset to a predetermined number of pseudo multipoles, as pseudo multipole information.

The memory unit 12 may store, for example, a file of a web page described with a language, such as HTML (Hypertext Markup Language), XML (Extensible Markup Language), and other markup languages, in order to cause a terminal device or the display unit 13 to display information acquired from a site of a horse race.

The display unit 13 may include liquid crystal display elements, or EL (electro luminescence) elements, for example. The display unit 13 may display image data on a horse race, for example.

The operation unit 14 may include a keyboard and a mouse, for example. This operation unit 14 permits a user to enter a response. Incidentally, when the display unit 13 is a touch switch type of display panel, such as a touch panel, the operation unit 14 may acquire information regarding the position at which a user contacts the display unit 13 or a user stays close to the display unit 13.

The I/O interface unit 15 performs interface processes between the system control unit 16 and the communication unit 11 and between the system control unit 16 and the memory unit 12.

The system control unit 16 includes a CPU (central processing unit) 16a, ROM (read only memory) 16b, and RAM (random access memory) 16c (examples of the storage means), for example. The CPU 16a reads and executes various programs stored in the ROM 16b or the memory unit 12, and accordingly the system control unit 16 functions as, for example, the seeking means that seeks pseudo multipoles in a frame image.

2. Operation of Information Processing Device 10

Next, a description will be given of an exemplary operation of the information processing device 10 according to one embodiment of the present invention, using FIG. 2 to FIG. 21.

2.1 Setting of Pseudo Multipole

Figure 5:
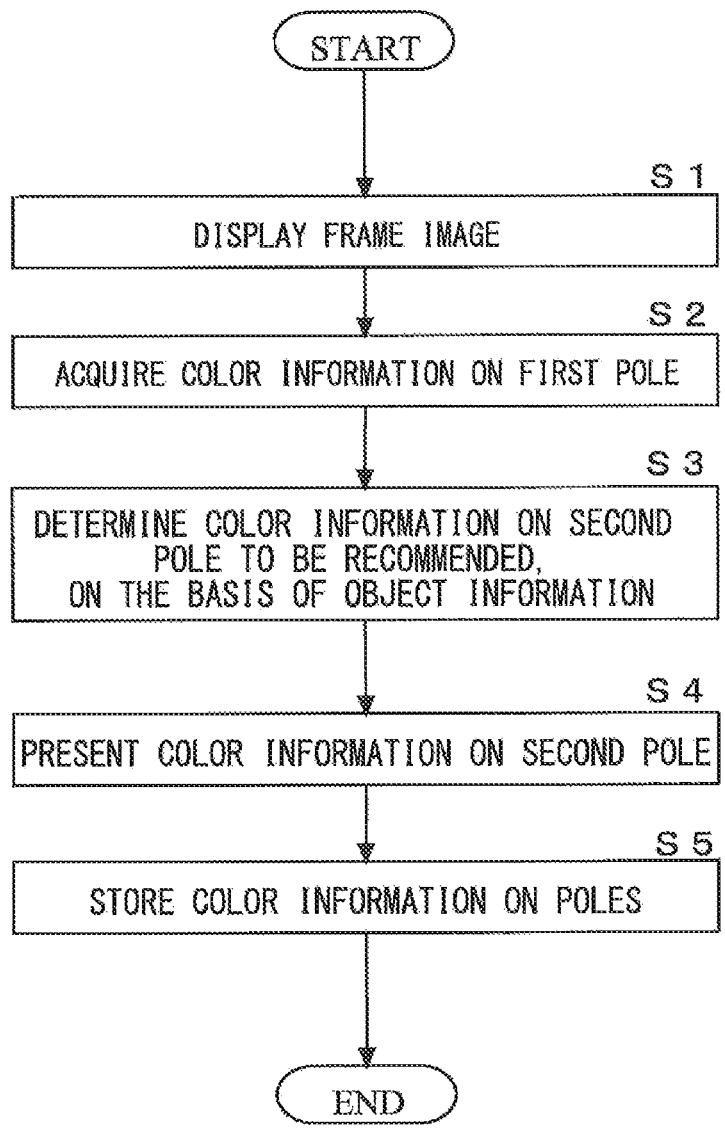
FIG. 5 is a flowchart of an exemplary operation to set pseudo multipoles of FIG. 1.
Figure 6:
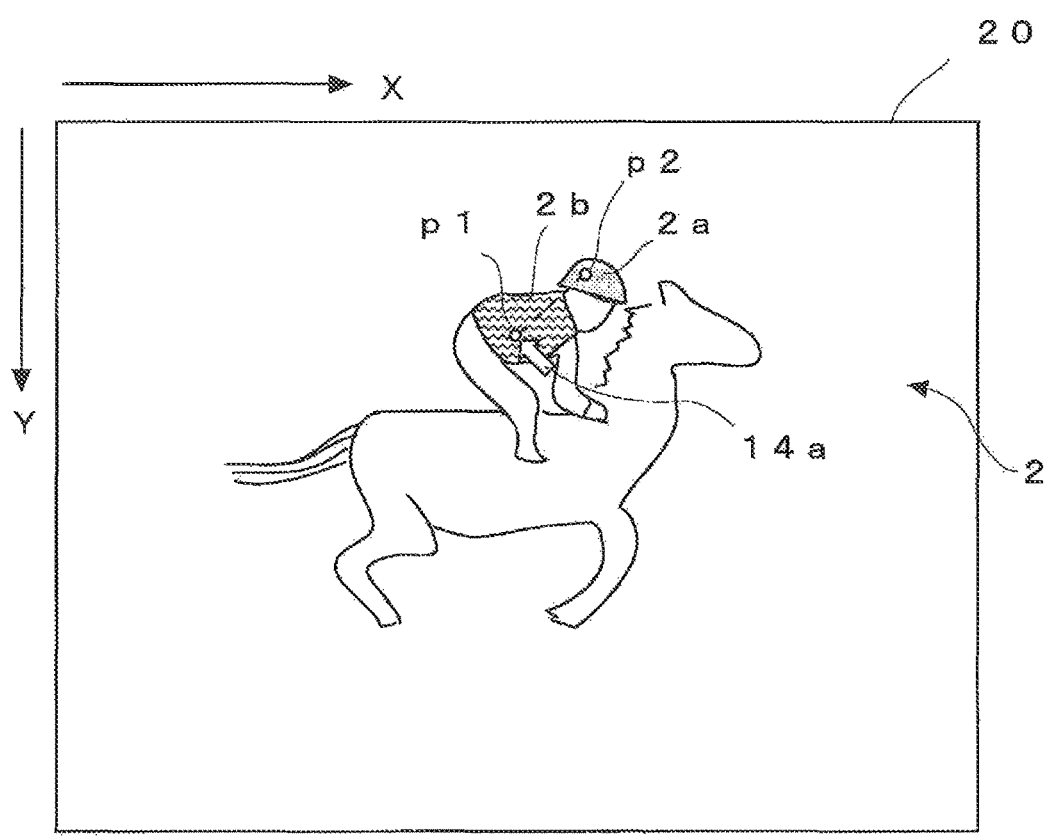
FIG. 6 is a schematic view illustrating an exemplary frame to which the pseudo multipoles of FIG. 1 are to be set.

First, setting of pseudo multipoles will be described using FIG. 5 and FIG. 6. FIG. 5 is a flowchart of an exemplary operation to set pseudo multipoles. FIG. 6 is a schematic view illustrating an exemplary frame to which the pseudo multipoles are to be set.

As illustrated in FIG. 5, the information processing device 10 displays a frame image (Step S1). More specifically, the system control unit 16 in the information processing device 10 reads out video data from the video DB 12a. Then, the system control unit 16 causes the display unit 13 to display a frame image in which an object appears as illustrated in FIG. 6.

Then, the information processing device 10 acquires the color information on a first pole of a pseudo multipole (Step S2). A user places a pointer 14a over the object displayed in the display unit 13 by using the operation unit 14 and clicks the operation unit 14. In response to this, the system control unit 16 acquires the color information on the image at the position indicated by the pointer 14a, as the information on the first pole. In the case of a pseudo dipole as illustrated in FIG. 6, for example, the pointer 14a is placed over a certain portion of a racing uniform part 2b of a jockey in an object 2 to be tracked and is clicked. In response, the system control unit 16 acquires the color information on the image at the position indicated by the pointer 14a, as the information on the first pole. Incidentally, the system control unit 16 may acquire the information on the position indicated by the pointer 14a, or the information on the position of the first pole in a frame, as the information on the position of a pseudo multipole in the initial frame when tracking an object.

Then, the information processing device 10 determines the information on a second pole to be recommended, on the basis of object information (Step S3). More specifically, the system control unit 16 refers to the object information DB 12b, and searches for an object, such as a helmet or a racing uniform, having a color similar to the color in the color information on the first pole (having a color falling within a predetermined range of an RGB, a hue, etc.). If an object having a color similar to the color in the color information on the first pole is found, the system control unit 16 seeks pixels whose colors are similar to one of the colors of the pair of helmet and racing uniform of the jockey, on the basis of the information on the pole-inter-distance r as illustrated in FIG. 4, in the vicinity of the pole-inter-distance r from t the first pole indicated by the pointer 14*a*, as candidates for the second pole.

In each of the race number and the horse number, the color of a helmet is paired with the color of a racing uniform. If a racing uniform that has a color similar to a color indicated by the color information on the first pole is searched, the color of the helmet paired with the racing uniform is determined. In other words, if a helmet that has a color similar to a color in the color information on the first pole is searched, the color of the racing uniform paired with the helmet is determined.

If the candidates for a plurality of second poles are searched, the system control unit 16 may determine that, for example, the color of the pixel which is the most similar to the color of the object is the color of the second pole to be recommended. Incidentally, the system control unit 16 may determine that the colors of the pixels set as the candidates are colors of the second pole to be recommended. In this case, color information on a plurality of pseudo dipoles is determined for a single first pole designated.

Incidentally, the system control unit 16 may acquire information on the position of the determined second pole in a frame, as information on the position of a pseudo multipole in the initial frame used to track the object. In this way, the information processing device 10 functions as an example of the initial position specifying means that specifies the position of a pseudo multipole in an initial frame.

Then, the information processing device 10 presents the color information on the second pole (Step S5). After having determined the color of the second pole to be recommended, the information processing device 10 causes the display unit 13 to present the color information on the poles, as illustrated in FIG. 3, by using numbers and colors. Incidentally, the information processing device 10 may indicate the position of the second pole in the frame image 20 as illustrated in FIG. 6 so that the color of the indicated position is identifiable.

Then, the information processing device 10 stores the color information on the poles (Step S5). If a user accepts the presented color information, the system control unit 16 assigns the pseudo dipole number to the color information as illustrated in FIG. 3. The system control unit 16 stores, as the setting pseudo multipole information, the color information on the designated first pole and the color information on the recommended and accepted second pole in the pseudo multipole DB 12*c*.

Incidentally, without a user's instruction, the system control unit 16 may set the color information on the first pole and on the second pole, on the basis of the colors of the helmet and racing uniform in the object information DB 12*b*. In some case, the color of an image may be changed due to weather and a direction of sunlight. Therefore, the system control unit 16 may select a color from among a variety of colors falling within a predetermined color range that is set with reference to the colors of the helmet and the racing uniform based on the object information DB 12*b*. Then, the system control unit 16 may set the pseudo multipole information on the basis of the color information on the selected color.

Incidentally, the information processing device 10 may refer to the object information DB 12*b* and may determine the colors of the first and second poles on the basis of the object information and the colors of the pair of helmet and racing uniform. In this case, the information processing device 10 may assign a plurality of colors centered on the colors of the helmet or the racing uniform to each of the first and second poles, thereby setting a plurality of pseudo dipoles. Furthermore, the user may designate two points in the frame image by using the pointer 14*a*, and the information processing device 10 may acquire the colors of the designated points, as the color information on the first and second poles.

Incidentally, a terminal device connected to the information processing device 10 via a network, for example, may make a display so that a user can set pseudo multipoles by using a terminal device.

After a pseudo multipole has been set, another pseudo multipole may be recommended. This recommendation may be based on the colors of the helmet and the racing uniform. Another pseudo multipole, whose color differs from the colors of the poles in the set pseudo multipole by a predetermined range, may be recommended.

As described above, the information processing device 10 functions as an example of a color information recommending means that recommends the color information on the remaining pole, in setting the setting pseudo multipole information, when the color information on the predetermined one of the poles has been set. Furthermore, the information processing device 10 functions as an example of the color information recommending means that recommends the color information on the remaining pole on the basis of the information on the object. Moreover, the information processing device 10 functions as an example of the color information recommending means that recommends one more pseudo multipole in setting the setting pseudo multipole information is set, after the at least one pseudo multipole has been set.

2.2 Tracking of Object

Figure 7:
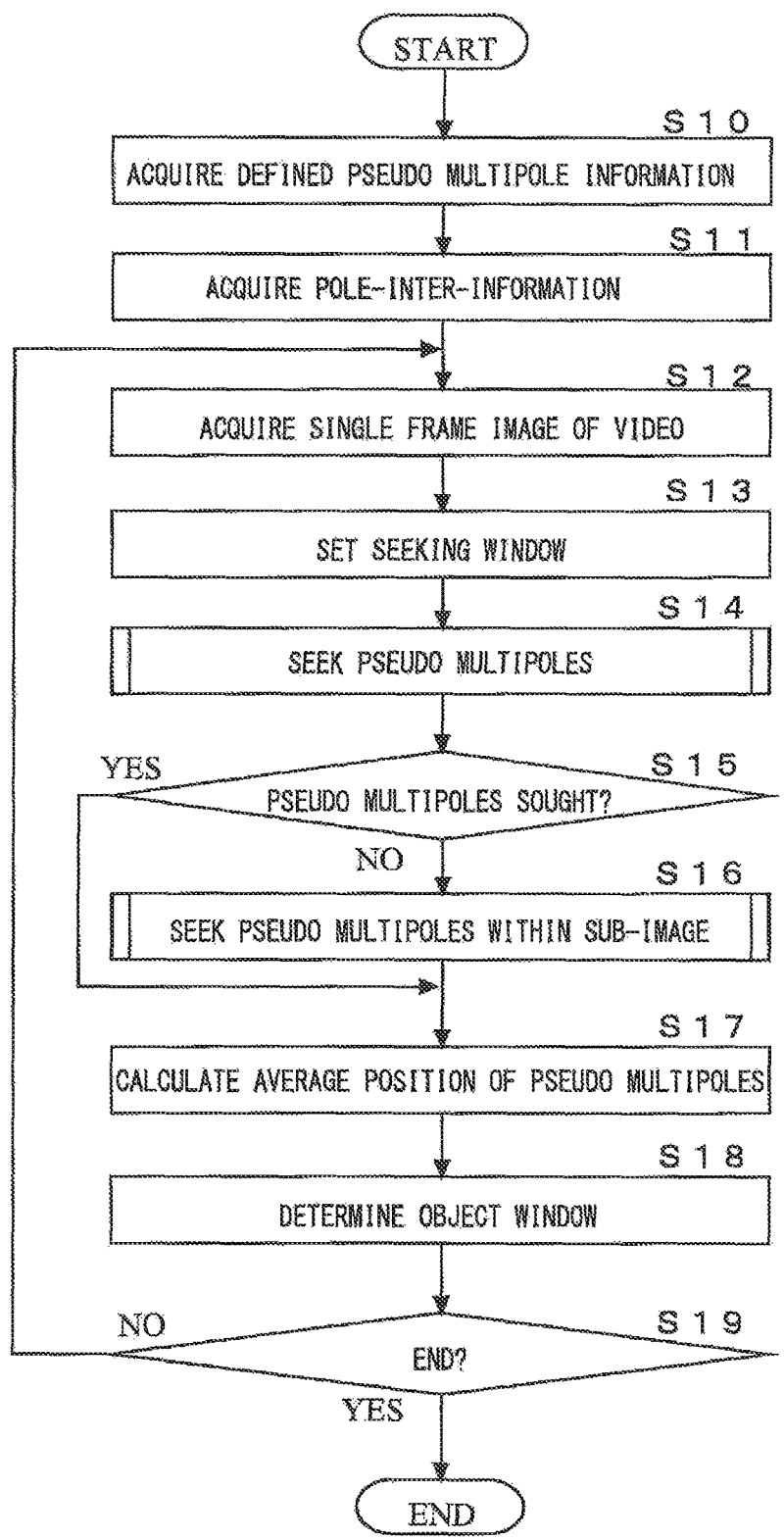
FIG. 7 is a flowchart of an exemplary operation to track an object of FIG. 1.
Figure 8:
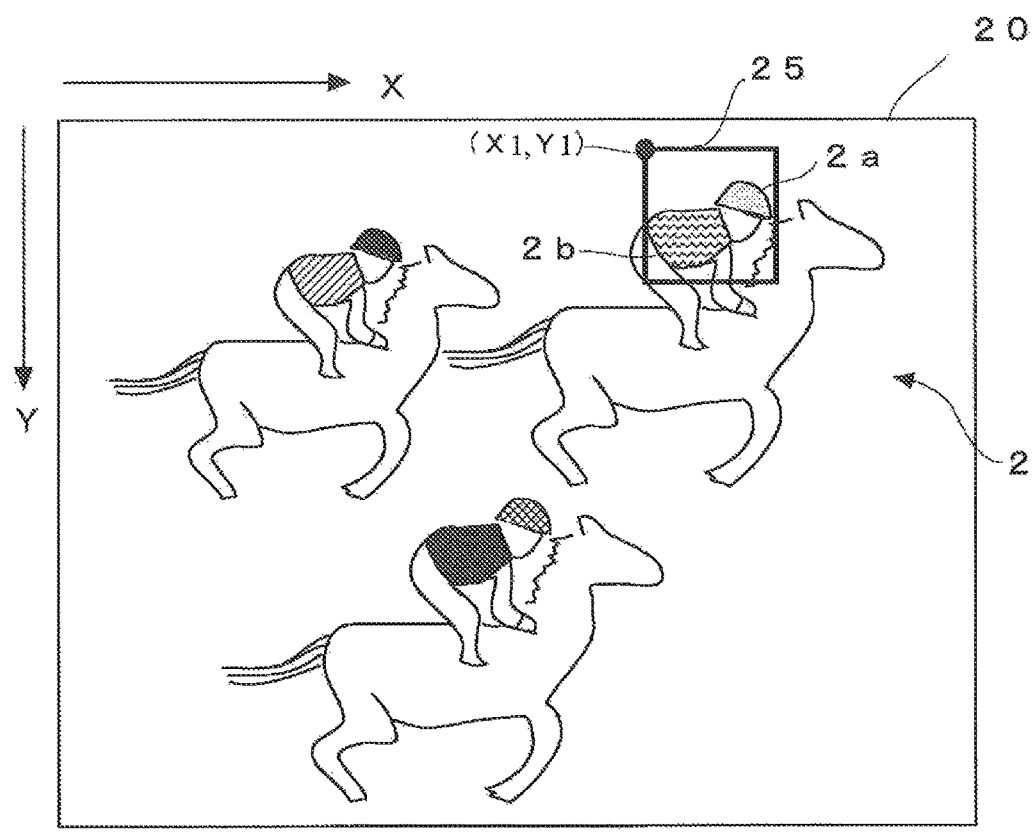
FIG. 8 is a schematic view illustrating an exemplary frame in a video that the information processing device of FIG. 1 subjects to processing.
Figure 9:
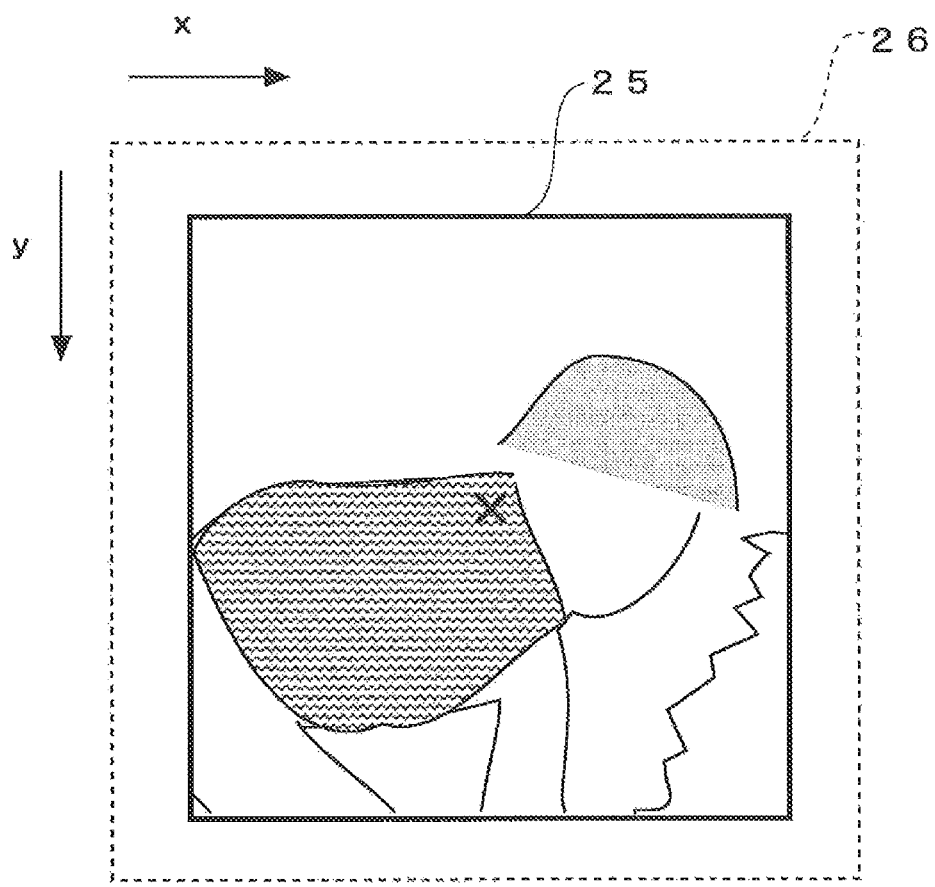
FIG. 9 is a schematic view illustrating an exemplary object window within the frame image of FIG. 6.
Figure 10:
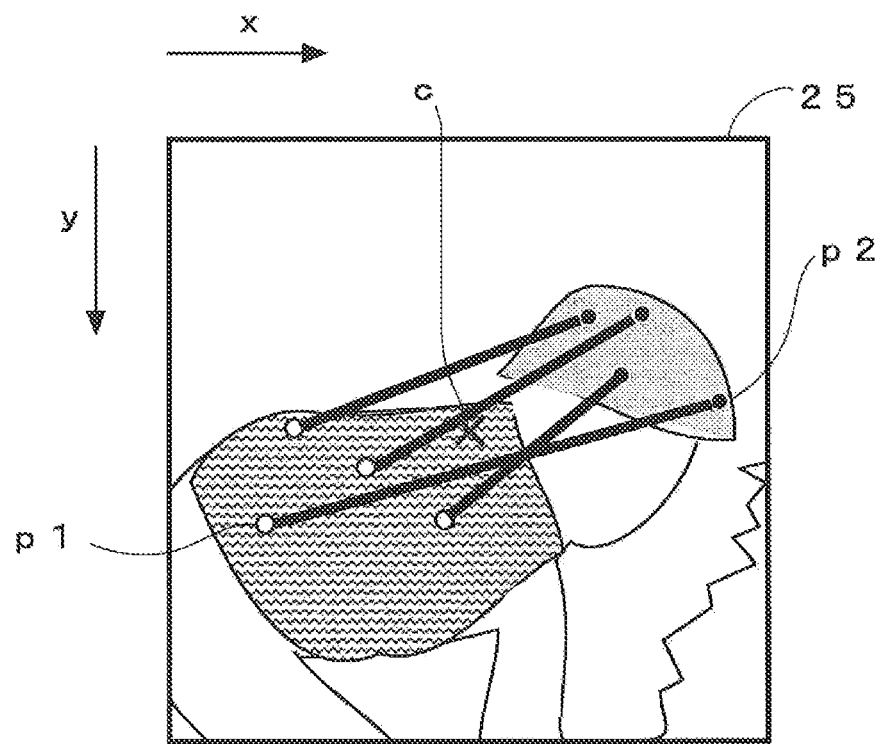
FIG. 10 is a schematic view illustrating exemplary pseudo dipoles within the object window of FIG. 6.
Figure 11:
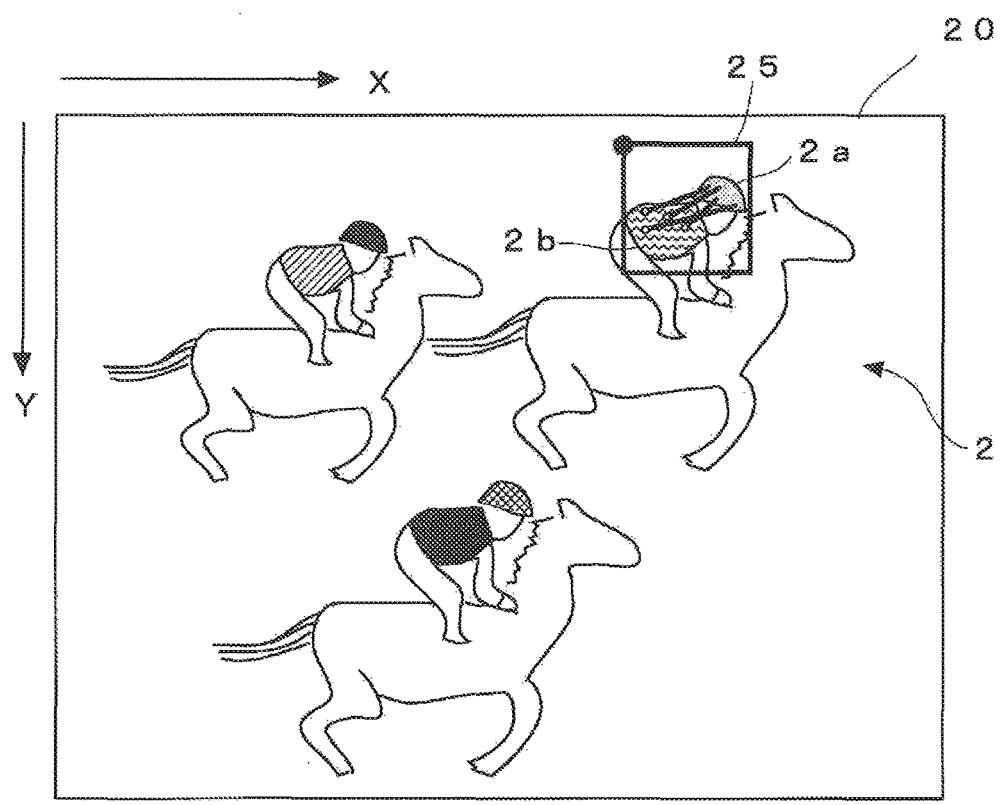
FIG. 11 is a schematic view illustrating exemplary pseudo dipoles in a specific frame image.
Figure 12:
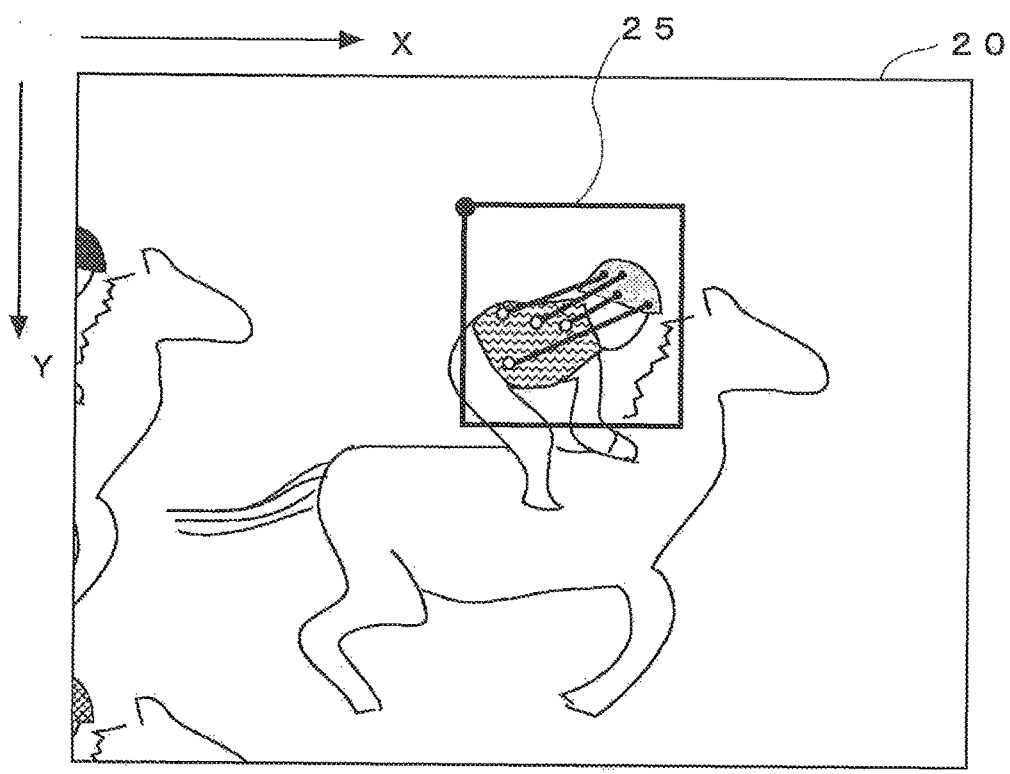
FIG. 12 is a schematic view illustrating exemplary pseudo dipoles in a specific frame image.
Figure 13:
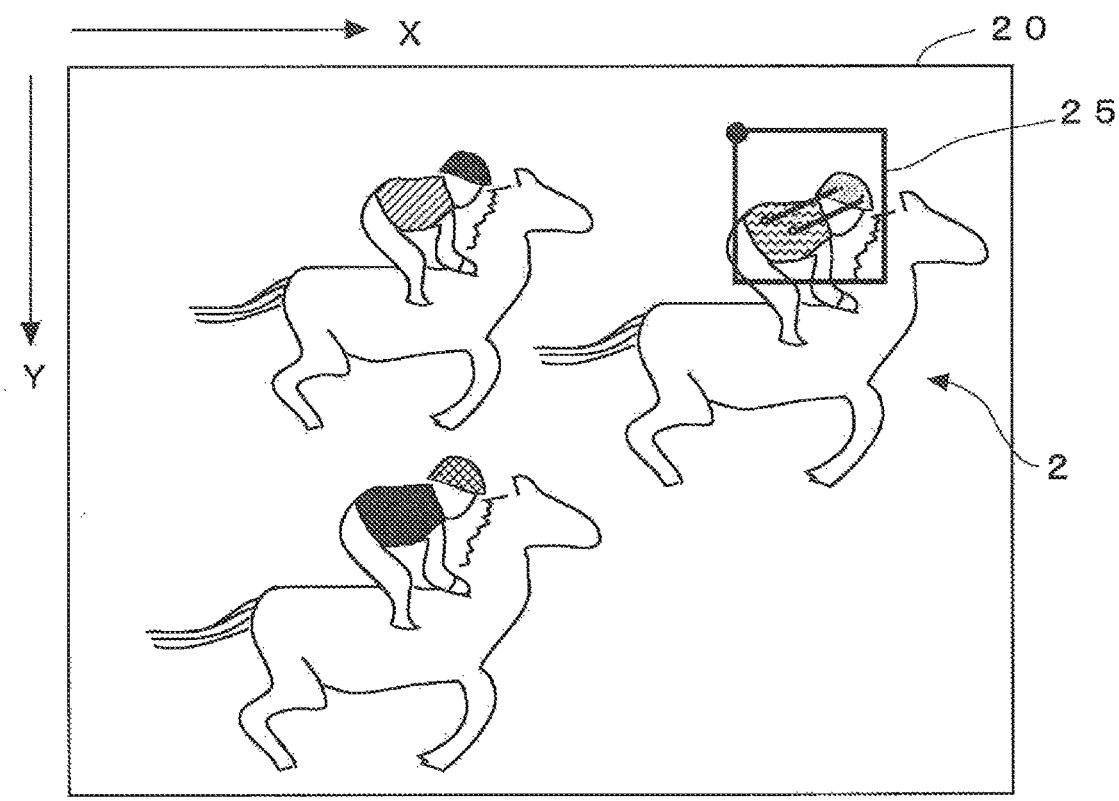
FIG. 13 is a schematic view illustrating exemplary pseudo dipoles in a specific frame image.

Next, tracking of an object will be described using FIG. 7 to FIG. 13. FIG. 7 is a flowchart of an exemplary operation to track an object. FIG. 8 is a schematic view illustrating an exemplary frame in a video that the information processing device subjects to processing. FIG. 9 is a schematic view illustrating an exemplary object window within the frame image. FIG. 10 is a schematic view illustrating exemplary pseudo dipoles within the object window. FIG. 11 to FIG. 13 are schematic views each illustrating exemplary pseudo dipoles in a specific frame image.

As illustrated in FIG. 7, the information processing device 10 acquires the setting pseudo multipole information (Step S10). More specifically, the system control unit 16 in the information processing device 10 acquires the color information on first and second poles in pseudo multipoles from the pseudo multipole DB 12*c* in the memory unit 12.

As described above, the information processing device 10 functions as an example of the setting pseudo multipole information acquisition means that acquires the setting pseudo multipole information of the pseudo multipole, in which the color information on the poles is related to a plurality of points in an image of a single predetermined frame and is set so as to correspond to the color information on the object.

Then, the information processing device 10 acquires the pole-inter-information (Step S11). More specifically, the system control unit 16 acquires pole-inter-distances r, which are an example of the pole-inter-information, from the pseudo multipole DB 12c.

As described above, the information processing device 10 functions as an example of the pole-inter-information acquisition means that acquires the pole-inter-information, which is associated with disposing of the poles in a pseudo multipole to be set at a predetermined distance or less.

Then, the information processing device 10 acquires an image of a single frame of a video (Step S12). More specifically, the system control unit 16 reads out video data from the video DB 12a. Following this, the system control unit 16 acquires a single frame of the video (an exemplary single frame of the video which has been preselected) and stores this frame in the RAM 16c, for example. For example, the system control unit 16 in the information processing device 10 may acquire an image of a single frame as illustrated in FIG. 8 (frame image 20) and cause the display unit 13 to display this frame image.

The video may be reproduced either in the temporally forward direction or in the temporally reverse direction. In this case, the acquired frame is different from the frame at Step S1. When the video is reproduced in the temporally forward direction, the frame acquired at Step S12 when the processing returns from Step S19 to Step S12 becomes a temporally subsequent frame (a subsequent frame in the reproduction direction of the video). The frame that has already been acquired at Step S12 becomes a temporally preceding frame (a frame preceding a single frame in the reproduction direction of the video). When the video is reproduced in the temporally reverse direction, the frame acquired at Step S12 when the processing returns from Step S19 to Step S12 becomes a temporally preceding frame (a frame subsequent to a single frame in the reproduction direction of the video). The frame that has already been acquired at Step S12 becomes a temporally preceding frame (a frame preceding a single frame in a reproduction direction of the video).

Then, the information processing device 10 sets a seeking window (Step S13). More specifically, as illustrated in FIG. 9, the system control unit 16 sets a seeking window 26 (exemplary seeking range) which contains this object window 25, for an object window 25 (exemplary identification range) which is used to identify an object to be tracked. The seeking window 26 is larger than the object window 25 and is set in a predetermined number of pixels disposed around the object window 25.

Examples of an identification range having a predetermined size which is used to specify the position of the object 2 include: an object window that contains both a helmet part 2a and a racing uniform part 2b of the object 2; an object window that contains a part of both a helmet part 2a and a racing uniform part 2b of the object 2; and an object window that contains the entire object 2; and an object window that contains a part of the object 2.

Incidentally, when the seeking window 26 may be set before the object window 25 is determined. For example, when the first processing is performed or when an object is missing, the seeking window 26 may be the entire frame image 20. Alternatively, the seeking window 26 may be a sub-image, which will be described later.

As an example of specifying the position of a pseudo multipole in an initial frame, in case that an initial reference position (x1, y1) and size of the object window 25 are set, a user may set the initial reference position and size of the object window 25 by using the pointer 14a. In addition, in case that an initial reference position (x1, y1) and size of the object window 25 is set, an initial position of the object window 25 may be set in setting pseudo multipoles. For example, a frame that has been used to set pseudo multipoles may be used as an initial frame when tracking an object. Then, the positions of the first and second poles which have been acquired from this initial frame may be used as the positions of the pseudo multipoles. Further, the initial position of the object window 25 may be set so as to correspond to the pseudo multipoles whose positions have been specified.

The typical size of the object window 25 may be preset to 32×32 pixels, for example. An initial value for the object window 25 does not necessarily have to be set. The object window 25 may be determined from pseudo dipoles that have been sought within the seeking window 26.

The shape of the object window 25 and the seeking window 26 is not limited to be rectangular, and the object window 25 and the seeking window 26 may have a circular shape or some other shape.

As described above, the information processing device 10 functions as an example of a seeking range setting means that sets a seeking range, in which the seeking means is to seek a pseudo multipole, depending on the position of the pseudo multipole in the frame preceding the single frame in the reproduction direction of the video. Furthermore, the information processing device 10 functions as an example of the seeking range setting means that sets a seeking range to be larger than the identification range having a predetermined size in which the position of the object in the preceding frame has been specified.

Then, the information processing device 10 seeks pseudo multipoles (Step S14). More specifically, within the seeking window 26, the system control unit 16 seeks pseudo multipoles which have color information similar to the colors of the color information on the poles in the acquired setting pseudo multipole information and conform to the acquired pole-inter-information. Details of the seeking pseudo multipoles will be described when a subroutine for seeking pseudo multipoles is described.

Then, the information processing device 10 determines whether pseudo multipoles have been sought (Step S15). More specifically, the system control unit 16 makes the determination on the basis of, for example, a flag indicating a result of seeking pseudo multipoles through the subroutine.

If no pseudo multipoles are sought (Step S15: NO), the information processing device 10 seeks pseudo multipoles within sub-images (Step S16). If an object to be tracked has gone to the outside of the frame, an object downsizes, or if occlusion occurs, such as an object hides behind the jockey of another horse, a building, or the like, no pseudo multipoles corresponding to the object may be temporarily sought. Details of seeking pseudo multipoles within sub-images will be described when a subroutine for seeking pseudo multipoles within a sub-image is described.

If pseudo multipoles are sought (Step S15: YES), the information processing device 10 calculates an average position of the pseudo multipoles (Step S17). More specifically, the system control unit 16 reads out the positions of the poles of the sought pseudo multipoles from the pseudo multipole DB 12c or the RAM 16c, for example. Then, the system control unit 16 calculates the average of the positions of the poles of the sought pseudo multipoles. As illustrated in FIG. 10, the average of the positions of the poles p1 and p2 of the sought pseudo multipoles are used as the center c.

The system control unit 16 calculates the maximums and minimums in the x and y directions in the positions of the poles of each pseudo multipole. Instead of these maximums and minimums, the dispersion of the positions of the poles of each pseudo multipole may be calculated. Incidentally, the average position of the pseudo multipoles may be the average position of the centers of the pseudo multipoles (e.g., the average position of the poles).

Then, the information processing device 10 determines an object window (Step S18). More specifically, the system control unit 16 determines the object window 25 whose center is set at the average position of the pseudo multipoles. Moreover, the system control unit 16 determines the size of the object window 25 depending on the maximums and minimums in the positions of the poles in each pseudo multipole. As illustrated in FIG. 10, for example, the information processing device 10 determines the object window 25 centered on the center c, so as to contain the pseudo multipoles.

After having determined the object window, as illustrated in FIG. 11, the information processing device 10 displays the object window 25 in the frame image 20 so that a track target is identifiable.

As illustrated in FIG. 12, when an object to be tracked is zoomed in, the distance between the poles in each pseudo dipole increases (a large value applies to the pole-inter-distance r), and thus the object window 25 is enlarged. As illustrated in FIG. 13, the object can be specified using the object window 25, regardless of the number of pseudo dipoles sought.

Then, the information processing device 10 determines whether the processing has been ended (Step S19). If the processing has not yet been ended (Step S19: NO), the processing returns to Step S12. Then, the system control unit 16 in the information processing device 10 sequentially acquires frames by capturing subsequent frame images.

Pseudo dipoles are found for the frames sequentially acquired in the above manner. On the basis of the positions of the pseudo dipoles determined for the frames sequentially acquired, the object 2 is continuously specified using the object window 25, for example. In this way, the object 2 is tracked.

If the processing has been ended (Step S19: YES), the system control unit 16 concludes the processing.

When the first processing is performed in the loop from Step S12 to Step S19, the initial frame precedes the single frame in a reproduction direction of the video. When the second or subsequent processing is performed, the frame acquired at Step S12 precedes the single frame in the reproduction direction of the video.

As described above, the information processing device 10 functions as an example of the object tracking means; the object tracking means tracks the object on the basis of: positions of pseudo multipoles in the image of the single frame which the position specifying means has specified; and positions of pseudo multipoles in the image of the frame preceding the single frame in the reproduction direction of the video which the initial position specifying means or the position specifying means has specified. In addition, the information processing device 10 functions as the object tracking means that tracks the object on the basis of the positions of the plurality of pseudo multipoles sought.

2.3 Subroutine for Seeking Pseudo Multipole

Figure 14:
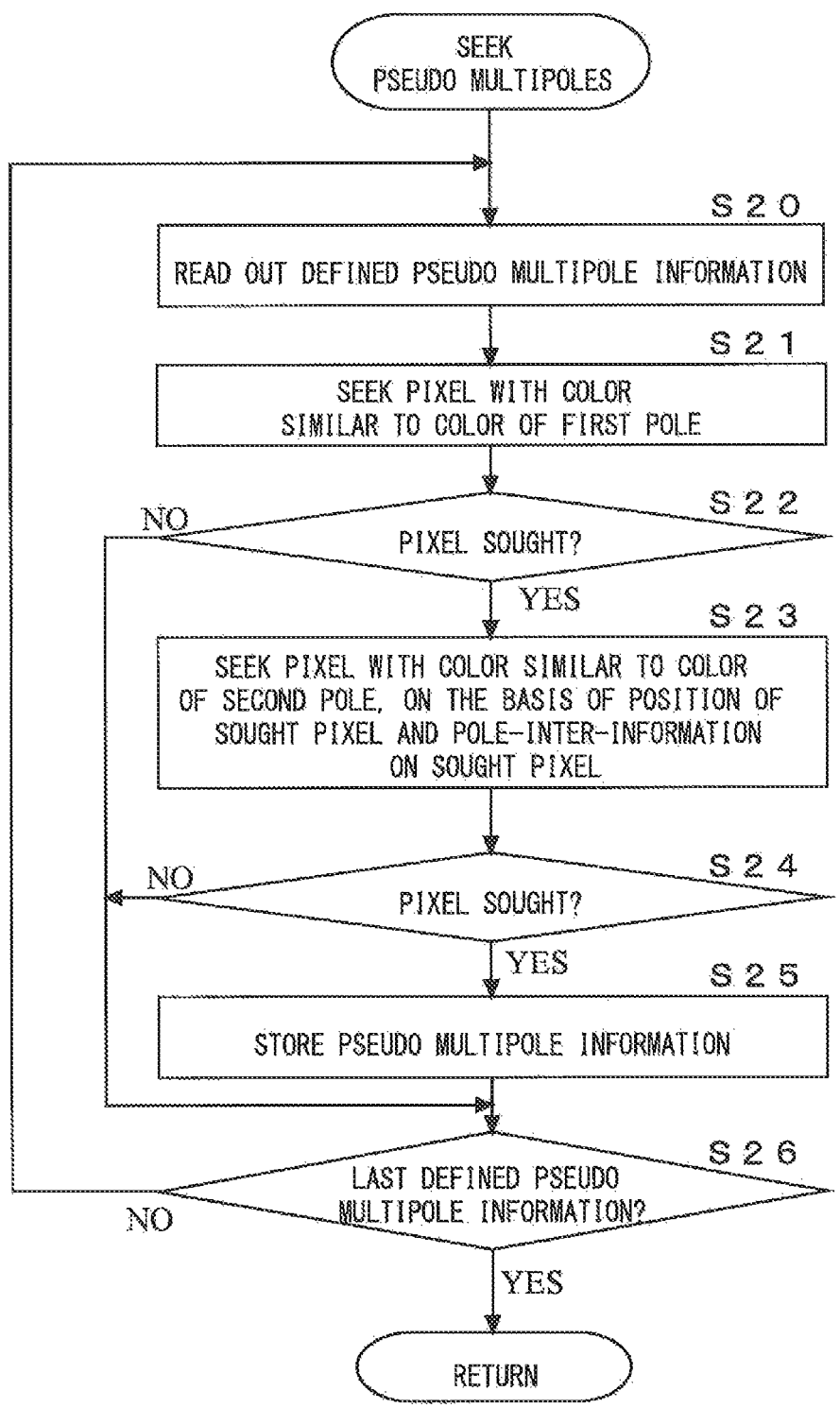
FIG. 14 is a flowchart of a subroutine for seeking pseudo multipoles of FIG. 5.
Figure 15:
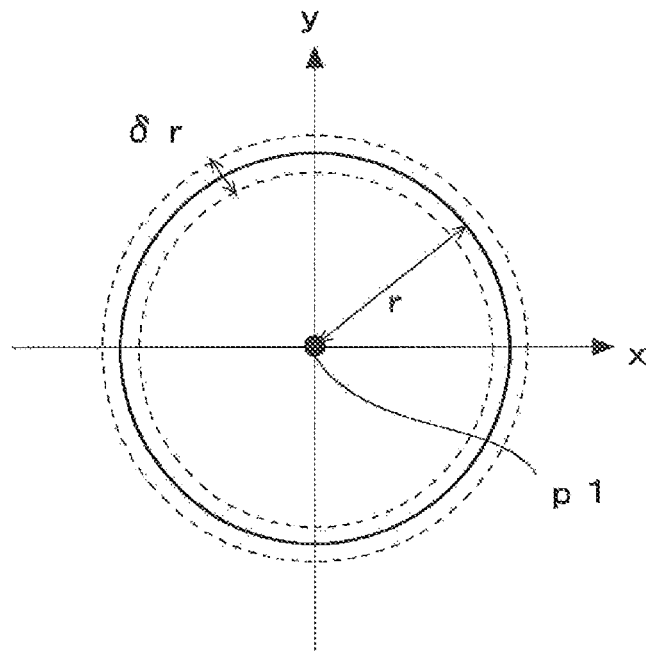
FIG. 15 is a schematic view illustrating an exemplary seeking a pseudo dipole.
Figure 16:
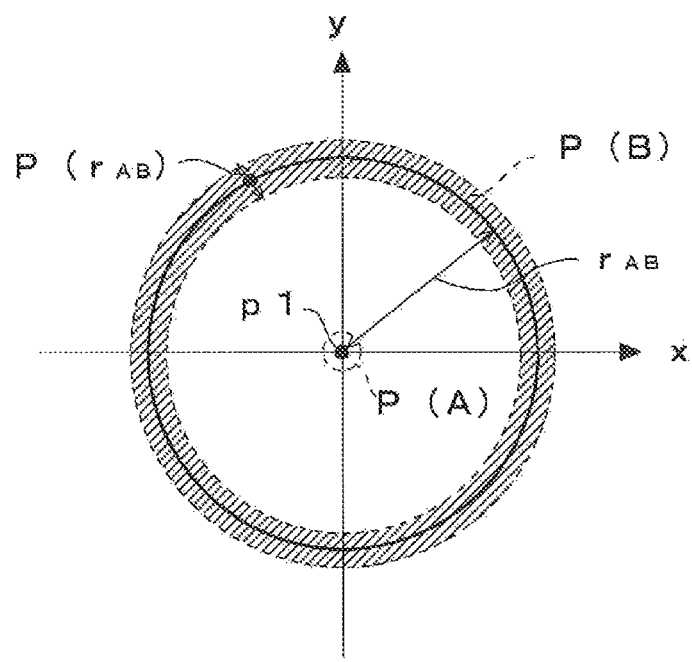
FIG. 16 is a schematic view illustrating an exemplary probability of presence of a pseudo dipole.
Figure 17:
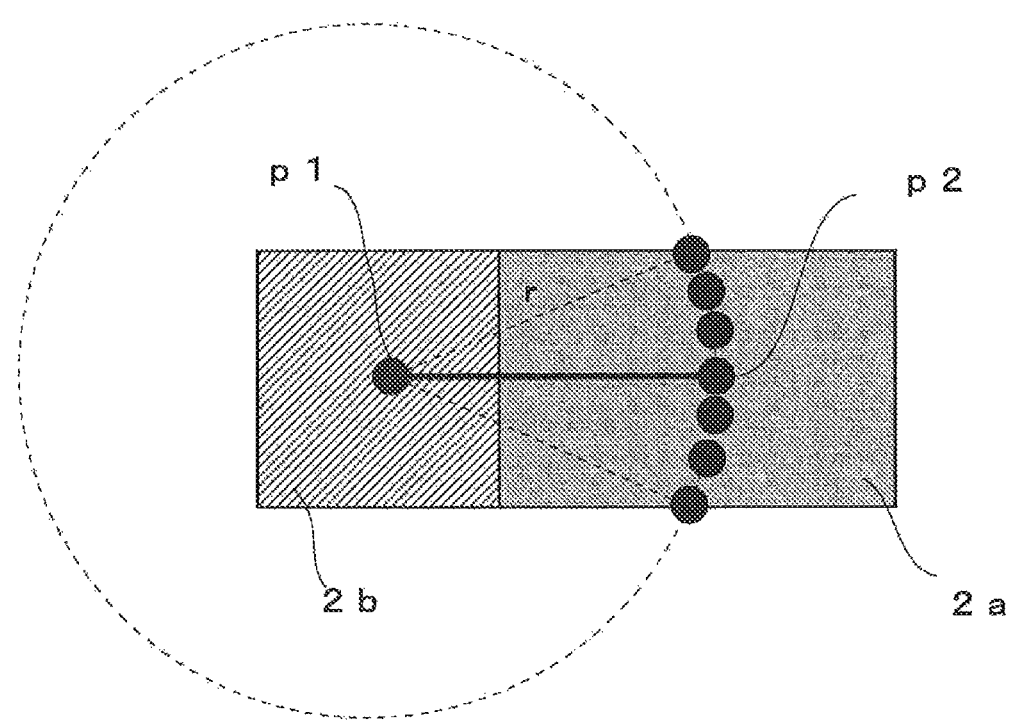
FIG. 17 is a schematic view illustrating an exemplary seeking poles.
Figure 18:
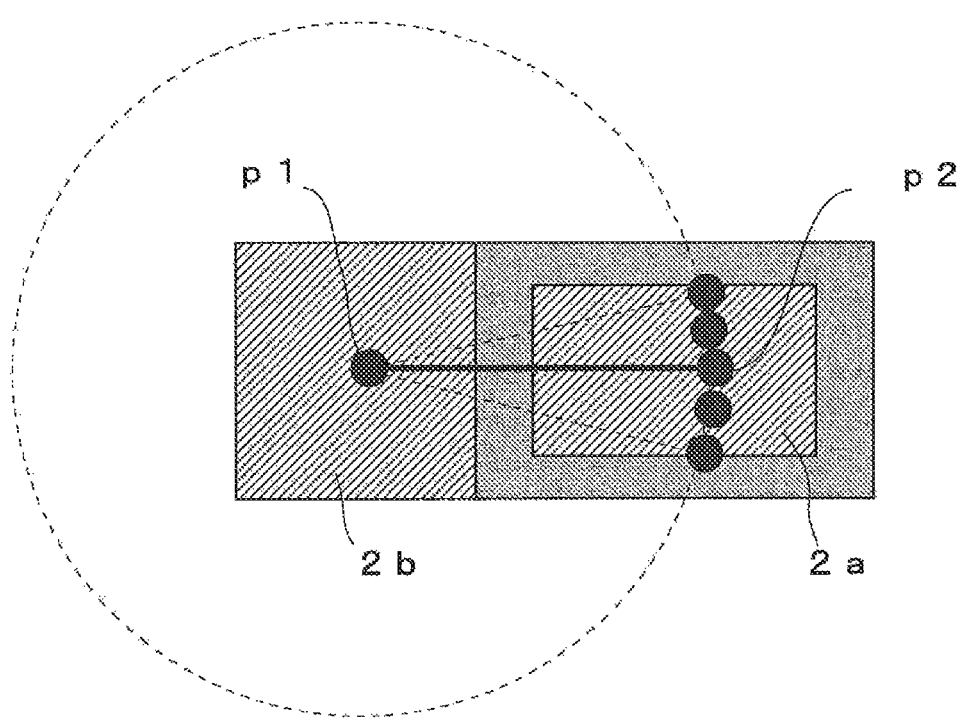
FIG. 18 is a schematic view illustrating an exemplary seeking poles.

Next, a subroutine for seeking pseudo multipoles will be described using FIG. 14 to FIG. 18. FIG. 14 is a flowchart of a subroutine for seeking pseudo multipoles. FIG. 15 is a schematic view illustrating an exemplary seeking a pseudo dipole. FIG. 16 is a schematic view illustrating an exemplary probability of presence of a pseudo dipole. FIG. 17 and FIG. 18 are schematic views each illustrating an exemplary seeking poles.

As illustrated in FIG. 14, the information processing device 10 reads out the setting pseudo multipole information (Step S20). More specifically, the system control unit 16 reads out the setting pseudo multipole information on one of a plurality of pseudo multipoles stored in the RAM 16c, for example, on the basis of pseudo dipole numbers.

Then, the information processing device 10 seeks a pixel whose color is similar to the color of the first pole (Step S21). More specifically, the system control unit 16 seeks a pixel within the seeking window 26, whose color falls within a predetermined color range of the color information on the first pole in the setting pseudo multipole information that has been read out.

Incidentally, if many pixels arranged adjacent to one another are sought, the position of the pixel having the most similar color or the average position of the sought pixels may be set to the position of the first pole.

Then, the information processing device 10 determines whether a pixel whose color is similar to the color of the first pole is sought (Step S22).

If a pixel having a color similar to the color of the first pole is sought (Step S22: YES), the information processing device 10 seeks a pixel whose color is similar to the color of the second pole, on the basis of the position of the sought each of pixels and the pole-inter-information on the sought each of pixels (Step S23). More specifically, as illustrated in FIG. 15, the information processing device 10 seeks a pixel having a color falling within a predetermined color range, in a circular ring of the width δr of a circle centered on the position of the first pole p1 and having a radius of a pole-inter-distance r, for the color of the color information on the second pole in the read-out setting pseudo multipole information. Herein, as illustrated in FIG. 4, a pole-inter-distances r has a plurality of value with reference to the pseudo multipole DB 12c. Therefore, for the plurality of pole-inter-distances r, pixels whose colors are similar to the color of the second pole are sought.

As an example that the poles are disposed at a predetermined distance or less, the information processing device 10 may seek a pixel whose pole-inter-distance r is not discrete but is a predetermined value or less and whose color is similar to the color of the second pole.

A pseudo dipole used herein includes: two poles each of which has a color value and positional coordinates; and an axis that interconnects the poles. If an image is handled in a RGB field, the probability of presence of any given pole in the RGB field can be defined. In short, how much the RGB value (color information) of a pole is similar to an RGB value indicated in the RGB field in terms of the Gaussian distribution is regarded as the probability.

Characteristics given to a pseudo dipole in advance are RGB values of both the poles and a pole-inter-distance therebetween. Once placed in the RGB field, the central coordinates of the pseudo dipole can be fixed. The probability that a pseudo dipole having desired characteristics (i.e., a pseudo dipole to which color information on the poles are set and a pole-inter-distance is given) can be placed at a certain location is a location at which the color information is similar to a color in the RGB field and the pole-inter-distance is substantially identical. Thus, the pseudo dipole can be placed at the highest disposition likelihood.

A disposition likelihood $\lambda$ can be expressed as follows. Here, let the state where a first pole p1 is placed in the RGB field be a state A, and let the state where a second pole p2 is placed in the RGB field be a state B. Let a state $r_{AB}$ be substantially the same as the pole-inter-distance r between the first pole p1 and the second pole p2. Therefore, the probability that the first pole p1 and the second pole p2 are placed in the RGB field as a pseudo dipole can expressed as the joint probability of the three states A, B, and $r_{AB}$.

Since the states A, B, and $r_{AB}$ can be handled independently of one another, the disposition likelihood λ can be modified into equation (1).

$$\lambda = P(A, B, r_{AB}) = P(A)P(B)P(r_{AB}) \quad \text{[Equation 1]}$$

Thus, the probability density of the states A, B, and $r_{AB}$ can be defined independently.

The probability density of the state A is given by the following equation (2). The probability density of the state A exhibits the Gaussian distribution with an average $\mu_A$ and a dispersion $\sigma_A$.

$$P(A) = N(\mu_A, \sigma^2) \quad \text{[Equation 2]}$$
$$= \frac{1}{\sqrt{2\pi\sigma_A^2}} \sum \exp\left\{-\frac{(x-\mu_A)^2}{2\sigma_A^2}\right\}$$

In this equation, the sum means the sum of the number of distributions.

The state B can also be expressed likewise.

$$P(B) = N(\mu_B, \sigma^2) \quad \text{[Equation 3]}$$
$$= \frac{1}{\sqrt{2\pi\sigma_B^2}} \sum \exp\left\{-\frac{(x-\mu_B)^2}{2\sigma_B^2}\right\}$$

In this equation, the sum means the sum of the number of distributions.

The state $r_{AB}$ shows the state where the pole-inter-distance becomes r when the states A and B exhibit a distribution reflecting the RGB field. Therefore, the probability density of the state $r_{AB}$ can also be expressed as follows.

$$P(r_{AB}) = N(\mu_r, \sigma_r^2) \quad \text{[Equation 4]}$$
$$= \frac{1}{\sqrt{2\pi\sigma_r^2}} \sum \exp\left\{-\frac{(x-\mu_r)^2}{2\sigma_r^2}\right\}$$

In this equation, the sum means the sum of the number of distributions.

Interpreting the right side of equation (2) in consideration of the implementation can derive a process for seeking a pseudo dipole using a pseudo dipole. That is, the probability that the first pole p1 can be placed when the first pole p1 is placed in the RGB field is expressed as P(A).

As illustrated in FIG. 16, the probability P(A) denotes the first pole p1 given first, and its small circle expresses a circle of the probability that the first pole p1 is present around the probability P(A).

The circular ring that is centered on where the first pole p1 is placed and that has a radius $|r_{AB}|$ is denoted by P(B). This circular ring P(B) shows the distribution of the probability that the second pole p2 is present. Either of the states A and B may be determined first; in this case, however, the state A is given first.

That is, locations at which a first pole p1 can be placed in the RGB field are searched for, and among the found locations, locations having high probability distributions are regarded as candidates.

A circle centered on the location of each candidate present and having a radius $|r_{AB}|$ is set to the central line of the circular ring. Then, the vicinity of the central line is sought, and a location having the highest likelihood at which the second pole p2 is placed is specified.

With the principle described above, the individual poles are sought.

Next, the information processing device 10 determines whether a pixel whose color is similar to the color of the second pole is sought (Step S24).

As illustrated in FIG. 17, in case that a plurality of pixels are disposed adjacent to one another on the circumference of a circle centered on the first pole and having a radius r, either the position of the pixel having the most similar color or the median or average position of the plurality of pixels may be set to the second pole p2. It should be noted that the example illustrated in FIG. 17 is applicable to the case where the color value of the first pole differs from the color value of the second pole by a predetermined value or more.

As illustrated in FIG. 18, even if the first and second poles have substantially the same color values, in case that a plurality of pixels are disposed adjacent to one another on the circumference of a circle centered on the first pole and having a radius r, either the position of the pixel having the most similar color or the median or average position of the plurality of pixels may be set to the second pole p2. The information processing device 10 may further comply with a condition that a pixel is present on a line connecting the first pole p1 to the second pole p2 and has a different color value from the color values of both the poles by a predetermined value or more.

In case that a pixel whose color is similar to the color of the second pole is sought (Step S24: YES), the information processing device 10 stores the pseudo multipole information (Step S25). More specifically, the system control unit 16 stores the positions of the sought first pole and the sought second pole related to the found first pole in the pseudo multipole DB 12c, the RAM 16c, or the like as the information on the sought pseudo multipole. In this case, a flag indicating that a pseudo multipole has been sought is set.

Then, the information processing device 10 determines whether the setting pseudo multipole information is the last one (Step S26). More specifically, the system control unit 16 determines whether the pseudo dipole number in the pseudo multipole DB 12c is the last number.

In case that the setting pseudo multipole information is not the last one (Step S26: NO), the processing returns to Step S20, and the information processing device 10 reads out the next setting pseudo multipole information. In case that the setting pseudo multipole information is the last one (Step S26: YES), the information processing device 10 ends the subroutine and performs the processing at Step S15.

As described above, the information processing device 10 functions as an example of the seeking means that seeks the single frame image in the video for a pseudo multipole. In the pseudo multipole, the poles have colors according to the colors of the color information on the poles in the acquired setting pseudo multipole information and are disposed at a predetermined distance or less. Furthermore, the information processing device 10 functions as an example of the seeking means that seeks a pseudo multipole in which the color value in a point disposed between the poles differs from color values of all the poles by a predetermined value or more.

2.4 Subroutine for Seeking Pseudo Multipole in Sub-Image

Next, a description will be given of a subroutine for seeking pseudo multipoles in a sub-image, using FIG. 19 and FIG. 20.

Figure 19:
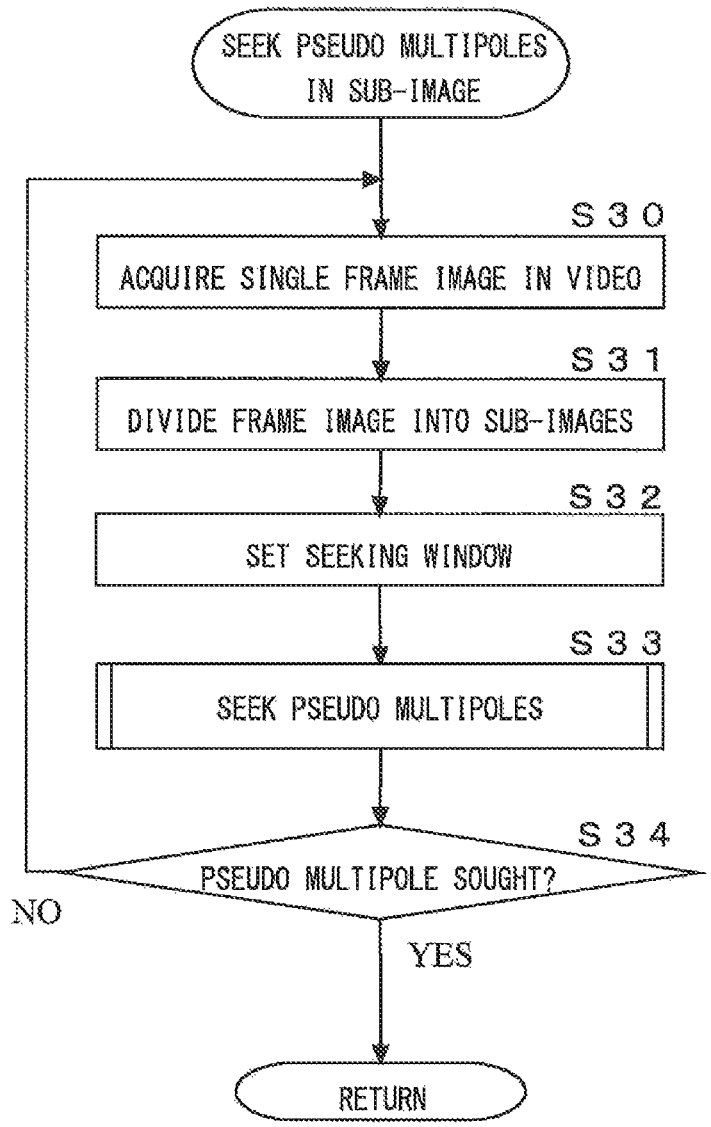
FIG. 19 is a flowchart of a subroutine for seeking pseudo multipoles in sub-images of FIG. 5.
Figure 20:
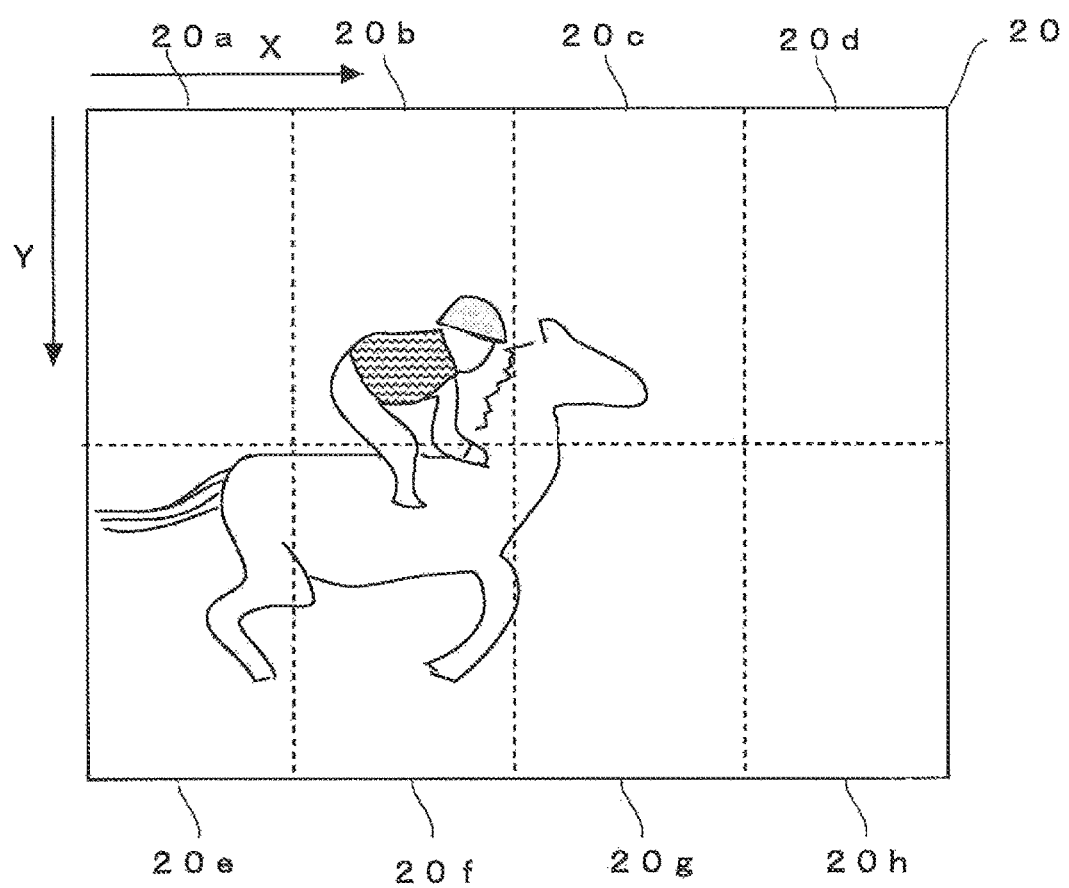
FIG. 20 is a schematic view illustrating exemplary sub-images obtained by a division of a frame image.

FIG. 19 is a flowchart of a subroutine for seeking pseudo multipoles in sub-images. FIG. 20 is a schematic view illustrating exemplary sub-images obtained by a division of a frame image.

As illustrated in FIG. 19, the information processing device 10 acquires an image of a single frame in a video (Step S30). More specifically, the system control unit 16 acquires a temporally next frame image.

Then, the information processing device 10 divides the frame image into sub-images (Step S31). More specifically, as illustrated in FIG. 20, the system control unit 16 divides the frame image 20 into eight sub-images.

Then, the information processing device 10 sets a seeking window (Step S32). More specifically, the system control unit 16 sets one of the sub-images to the seeking window. For example, a sub-image 20a is set to the seeking window.

Then, the information processing device 10 seeks pseudo multipoles (Step S33). The system control unit 16 seeks pseudo multipoles through the subroutine for seeking pseudo multipoles, as in Step S14.

Then, the information processing device 10 determines whether a pseudo multipole has been sought (Step S33). The system control unit 16 determines whether a pseudo multipole has been sought, as in Step S15.

If no pseudo multipoles are sought (Step S34: NO), the information processing device 10 returns to Step S30 and acquires the temporally next frame image.

After having divided the frame image into the sub-images, at Step S32, the information processing device 10 sets a sub-image 20b to a seeking window. Then, at Step S33, the information processing device 10 seeks pseudo multipoles.

The information processing device 10 repeats the processes at Step S30 to Step S34 until a pseudo multipole has been sought. As a result, sub-images 20c to 20h are sequentially set to the seeking window. In case that no pseudo multipoles have been sought in the sub-images 20c to 20h, at Step S32, the processing target returns to the sub-image 20a and the seeking window is set.

According to the foregoing embodiment, even if a pixel appears with its color similar to a color of the outside of the object 2, because of tracking the object 2 by using a pseudo multipole which has color information and in which the poles p1 and p2 are disposed at a limited distance, the tracking precision is improved when tracking a specific object in a video.

Since the poles are disposed at a predetermined distance or less, namely, the distance has a range (e.g., a plurality of distances are prepared), it is possible to support the case where an object is varied in size by being zoomed in or out. Moreover, since the pole-inter-distance r is limited, namely, the poles are disposed at a predetermined distance or less, the magnitudes of pseudo multipoles are prevented from dispersing, enabling a highly precise tracking. By preventing dispersion of the magnitudes of pseudo multipoles, the pseudo multipoles are determined so as not to bridge both an object to be tracked and its background or both an object to be tracked and another object. Thus, highly precise tracking can be achieved.

Since pseudo multipoles in each frame are sought on the basis of setting pseudo multipole information that has been set in advance, it is possible to find pseudo multipoles independently of the previous or preceding frames in a reproduction direction of a video. Therefore, even if an occlusion occurs or an object has moved to the outside of a frame and accordingly the continuity of the object is interrupted, it is possible to track the object by seeking pseudo multipoles on the basis of the setting pseudo multipole information. In addition, it is possible to track an object, regardless of a reproduction direction of a video, even when the video is reproduced in the reverse direction.

As illustrated in FIG. 3, with a range of setting pseudo multipole information and color information on each pole which has a variety of color values, it is possible to track an object 2 with high precision even when a tint of the object 2 is varied due to a change in weather, a change in a sun angle, or a change in a camera angle.

When seeking an image of a single frame in a video for a pseudo multipole, in which its poles have colors similar to colors in color information on poles in acquired setting pseudo multipole information and are disposed at a predetermined distance or less, because of seeking poles whose colors are similar to colors in color information on poles in setting pseudo multipole information that has been acquired in advance, the positions of the poles are less likely to disperse and thus a highly precise tracking can be achieved. Even when an object to be tracked has moved to the outside of the frame, the object downsizes, or occlusion occurs, for example, if the object hides behind the jockey of another horse, a building, or the like, it is possible to track the object 2 with high precision.

When the seeking range in which a pseudo multipole is to be sought is set depending on a position of the pseudo multipole in a frame preceding a single frame in a reproduction direction of a video, since seeking range is located within a limited area, such as within an area in the vicinity of the pseudo multipole in the preceding frame, it is possible to track the object 2 accurately and swiftly. When especially a temporally adjacent frame (temporally preceding or subsequent frame) is used as a preceding frame in a reproduction direction of a video, since a seeking range is limited in accordance with motion of an object 2 with time (in temporally forward or reverse direction) and using information in the preceding or subsequent frame, it is possible to track the object 2 accurately and swiftly.

Since the pole-inter-distance r of a pseudo multipole depends on the size of the object 2, the seeking range is set depending on the size of the object 2, so that it is possible to support an object 2 having a variable size.

When a seeking range (e.g., seeking window 26) is set so as to be larger than an identification range (e.g., object window 25) having a predetermined size which is used to specify a position of the object 2 in the preceding frame, it is possible to track the object 2 accurately even when the object 2 in the image is varied in size by being zoomed in or out. Since the identification range is finite, pseudo multipoles apart from the object 2 are rejected, so that the racking precision can thereby be improved.

In setting the setting pseudo multipole information, when setting color information on a pole p1, which is a predetermined one of poles p1 and p2, in case that the remaining pole p2 is recommended, the user can easily set color information on the remaining pole p2 in the pseudo multipole after having set the color information on the specific pole p1. In addition, for the purpose of improving the tracking precision, it is possible to recommend the color information on the poles whose colors and hues greatly differ from each other.

In case of recommending color information on a remaining pole on the basis of information concerning the object 2 (e.g., the colors of a racing uniform and a helmet), it is possible to help presentation of color information that enables an improvement in the tracking performance.

In setting the setting pseudo multipole information, in case that a user sets at least one pseudo multipole and then another pseudo multipole is recommended, for example, since many other pseudo multipoles required to set pseudo multipoles can be recommend for pseudo multipoles that a user has selected from an image and set, many pseudo multipoles can thereby be set in accordance with a user's selection so as to improve the tracking precision. In addition, since the user does not have to set many pseudo multipoles, the user can easily use the information processing device 10.

When a position of the object 2 is specified on the basis of positions of a plurality of pseudo multipoles sought, it is possible to specify the position of the object 2 more accurately, constantly improving the tracking precision.

When seeking a pseudo multipole in which color value in a point located between the poles p1 and p2 differs from the color values of all the poles by a predetermined value or more, as illustrated in FIG. 18, it is possible to seek the pseudo multipole accurately even when the multipoles have similar colors.

Figure 21:
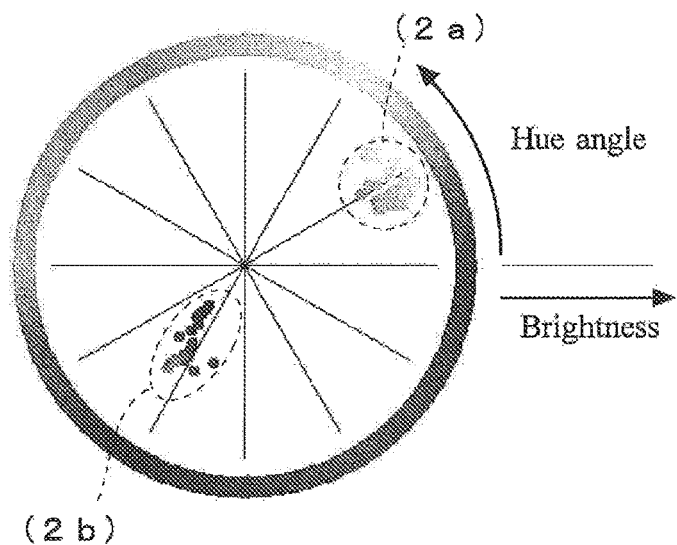
FIG. 21 is a schematic view illustrating exemplary pseudo dipoles of objects.
Figure 22:
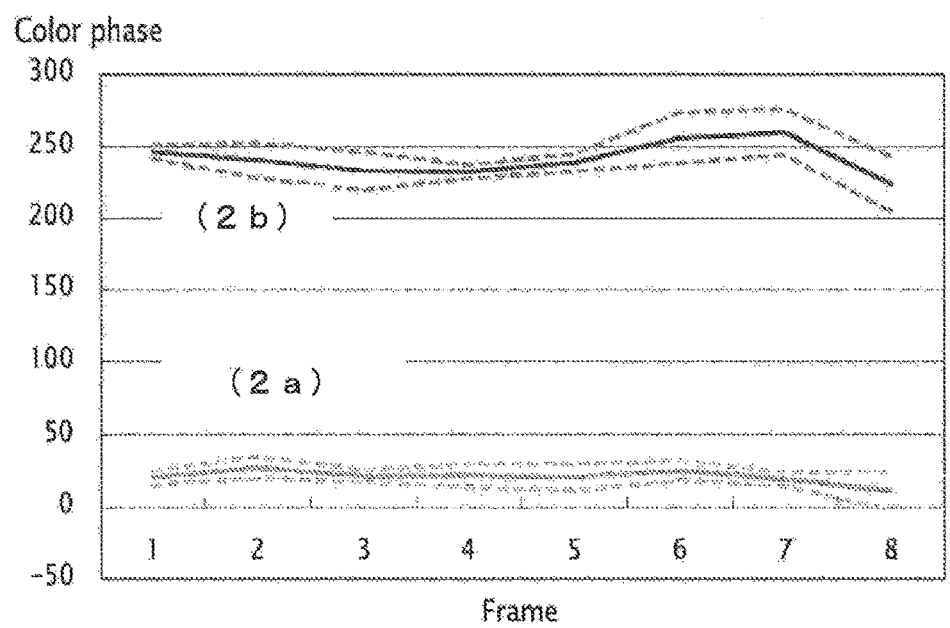
FIG. 22 is a schematic view illustrating an exemplary average of a hue dispersion of an object and exemplary dispersion.

Herein, as illustrated in FIG. 3, the color information is expressed as RGB values in a structure in which pseudo dipoles are defined. However, as illustrated in FIG. 21, a colorimetric system in which a hue in an HSV color space, a Lab color space, or the like is used as a parameter may be employed. This can set colors for an object substantially invariant for zooming in or out of the object, an angle of the object, and weather, as illustrated in FIG. 22. In other words, the hue angle is substantially constant, regardless of zooming in or out of the object, an angle of the object, and the like.

In FIG. 21, a plurality of pixels are sampled from parts (small circles) related to the helmet part 2a and the racing uniform part 2b of the object 2, and hue angles and brightness are plotted on a hue circle. In FIG. 22, hue angles of the parts related to the helmet part 2a and the racing uniform part 2b that were observed at regular frame intervals are plotted. In FIG. 22, the averages are shown by a solid line, and the dispersion is shown by a part between broken lines.

Figure 23:
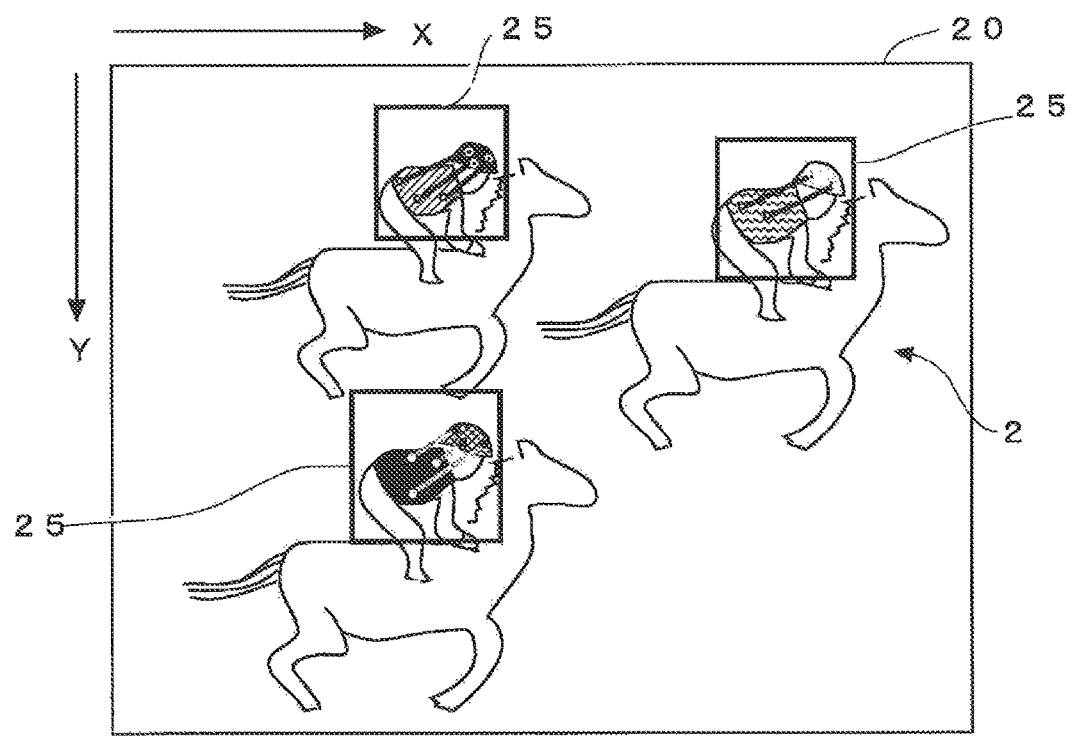
FIG. 23 is a schematic view illustrating exemplary transitions of an average and dispersion of a hue.

As illustrated in FIG. 23, the information processing device 10 may seek pseudo dipoles and set an object window 25 for each individual object. In this case, before the pseudo multipoles are set, color information on poles corresponding to the colors of helmets and racing uniforms of objects is preset. Thus, the information processing device 10 is applicable to a plurality of objects.

2.5 Exemplary Pseudo Multipole

Next, a pseudo multipole other than a pseudo dipole will be described using FIG. 24 to FIG. 26.

Figure 24:
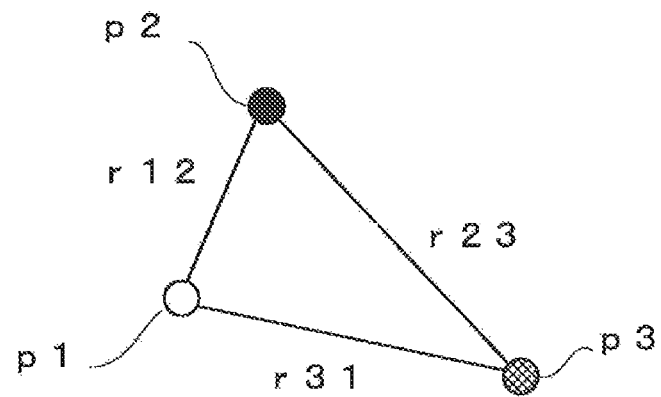
FIG. 24 is a schematic view illustrating an exemplary pseudo three-pole.
Figure 25:
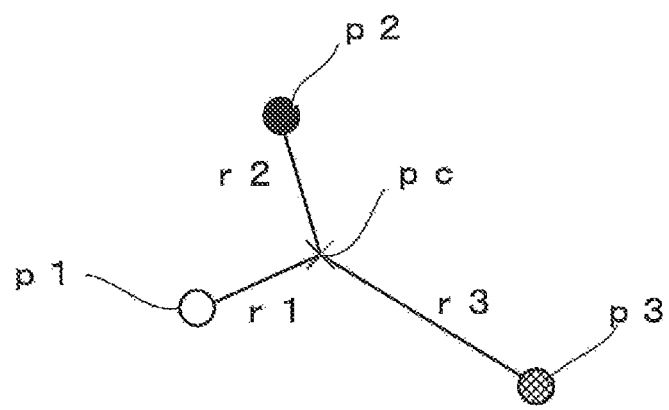
FIG. 25 is a schematic view illustrating an exemplary pseudo three-pole.

FIG. 24 and FIG. 25 are schematic views each illustrating an exemplary pseudo three-pole. FIG. 26 is a schematic view illustrating an exemplary pseudo quadrupole.

In addition to pseudo dipoles having two poles, this embodiment is applicable to pseudo three-poles, pseudo quadrupoles, and other pseudo multipoles As illustrated in FIG. 24, color information is set to poles p1, p2, and p3 of a pseudo three-pole, as setting pseudo multipole information. Then, as illustrated in FIG. 4, a plurality of values are set to each of pole-inter-distances r12, r23, and r31 of the poles in the pseudo three-pole so that the distances between poles each become a predetermined value or less.

As illustrated in FIG. 25, distances r1, r2, and r3 between the respective poles and a point pc may be set with reference to the point pc, as pole-inter-distances between the poles in the pseudo three-pole.

If seeking a pseudo three-pole, the information processing device 10 performs an additional process for seeking a pixel whose color is similar to the color of the third pole p3 on the basis of the pole-inter-distances r23 and r31, after YES at Step S24.

Figure 26:
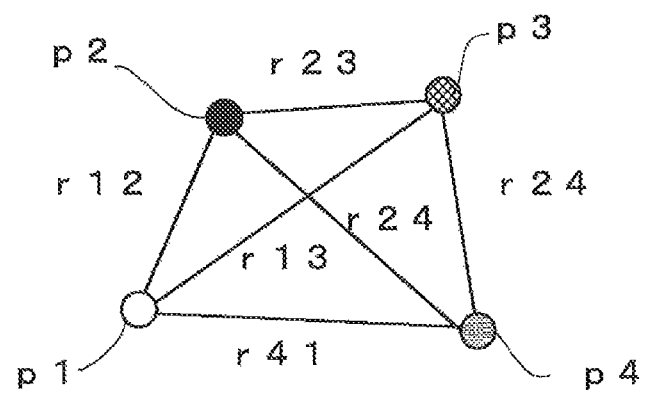
FIG. 26 is a schematic view illustrating an exemplary pseudo quadrupole.

As illustrated in FIG. 26, in the case of a pseudo quadrupole, color information is set to poles p1, p2, p3, and p4 of the pseudo quadrupole as setting pseudo multipole information. Then, as illustrated in FIG. 4, a plurality of values are set to each of pole-inter-distances r12, r23, r23, r24, r41, r13, and r24 of the poles in the pseudo quadrupole so that the distances between poles each become a predetermined value or less.

If seeking a pseudo quadrupole, the information processing device 10 performs an additional process for seeking a pixel whose color is similar to the color of the fourth pole p4.

As described above, when a pseudo multipole has three or more poles, it is possible to support a case of multiple colors, such as stripped patterns.

Information concerning the ordered fashion in which poles are arranged may be used to seek poles. Examples of possible ordered fashions of color include a linear fashion and a circular ring fashion.

There are some exemplary national flags in which three colors are arranged in a linear fashion. In the flag of Lithuania, yellow (Y), green (G), and red (R) colors are arranged in the vertical direction from the top to the bottom. In the flag of Cameroon, the colors are arranged in the order of G, R, and Y in the horizontal direction from the left to the right. In the flag of Guinea, the colors are arranged in the order of R, Y, and G in the horizontal direction from the left to the right. Even if the top, bottom, right, and left are ignored, the three countries can be distinguished from one another.

There are some other national flags, which are examples in which colors are arranged in a circular ring fashion. In the flag of the Czech Republic, the peaks of three colored regions are present at substantially the center. In this flag, among the three regions, the region on the left has a dark blue color (Db), the region on the upper right is white (W), and the region on the lower right is red (R). In short, a circular ring having Db, W, and R is formed.

Likewise, in the flag of the Philippines, the peaks of three colored regions are present at substantially the center. In this flag, among the three regions, the region on the left has a white color (W), the region on the upper right is dark blue (Db), and the region on the lower right is red (R). In short, a circular ring having W, Db, and R is formed. In this way, the two flags can be distinguished from each other on the basis of a circular ring fashion.

When failing to seek at least one of the poles of a pseudo multipole, the information processing device may estimate a position of another pole from a sought pole on the basis of a positional relationship between the poles, thereby finding the pseudo multipole. In this way, an object can be tracked using a pseudo multipole even when the object is partially hidden and a part of poles of the pseudo multipole is thereby hidden. For example, if one of the poles in a pseudo three-pole is hidden, the position of the hidden pole can be estimated from the pole-inter-distances between the poles.

As described above, the information processing device 10 functions as the seeking means that, when failing to seek at least one of the poles in a pseudo multipole, estimates a position of another pole from a sought pole on the basis of a positional relationship between the poles, thereby finding the pseudo multipole.

Poles whose colors conform to colors in color information on the poles in setting pseudo multipole information acquired by the information processing device 10 may be, for example, poles whose colors are similar to colors in color information in the poles of a pseudo multipole in an image of a frame preceding a single frame in a reproduction direction of the video. In this case, when an object to be traced has moved to the outside of the frame, the object downsizes, or an occlusion occurs, such as if the object hides behind the jockey of another horse, a building, or the like, the information processing device 10 seeks poles whose colors are similar to colors in color information on poles in acquired setting pseudo multipole information.

It should be noted that the present invention is not limited to the embodiments described above. The foregoing embodiments are exemplary, and any other embodiments that have substantially the same configurations as the technical ideas described in the claims of the present invention and produces substantially the same effects as those technical ideas should be included in the technical scope of the invention.

EXPLANATION OF REFERENCE NUMERALS

2: Object
10: Information processing device
16: System control unit
20: Frame
25: Object window
26: Seeking window
p1, p2, p3, p4: Pole

The invention claimed is:

1. An information processing device that tracks a predetermined object in a video having a plurality of frames, comprising:
at least one memory configured to store computer program code;
at least one processor configured to access said computer program code and operate as instructed by said computer program code, said computer program code including:
setting pseudo multipole information acquisition code configured to cause at least one of said at least one processor to acquire setting pseudo multipole information on a pseudo multipole, the setting pseudo multipole information being set such that color information on poles is related to color information on the object, the poles corresponding to a plurality of points in an image of a single predetermined frame;
setting distance information acquisition code configured to cause at least one of said at least one processor to acquire setting distance information in which distances between the poles of the pseudo multipole are set in a discrete manner;
initial position specifying code configured to cause at least one of said at least one processor to specify a position of the pseudo multipole in an initial frame;
seeking code configured to cause at least one of said at least one processor to seek an image of a single frame in the video for the pseudo multipole, the pseudo multipole having poles whose colors conform to colors in the color information on the poles in the acquired setting pseudo multipole information, a distance between the poles of the pseudo multipole being equal to one of the distances in the acquired setting distance information;
position specifying code configured to cause at least one of said at least one processor to specify a position of the found pseudo multipole in the image of the single frame of the video;
object tracking code configured to cause at least one of said at least one processor to track the object on the basis of the position of the pseudo multipole in the image of the single frame specified and the position of the pseudo multipole in an image of a frame preceding the single frame in a reproduction direction of the video which at least one of the at least one process has specified via the initial position specifying code or the position specifying code; and
seeking range setting code configured to cause at least one of said at least one processor to set a seeking range that is larger than an identification range having a predetermined size which is used to specify the position of the object in the preceding frame.

2. The information processing device according to claim 1, wherein
the seeking code is configured to cause at least one of said at least one processor to seek the image of the single frame in the video for the pseudo multipole, the pseudo multipole having poles whose colors are similar to colors in color information on the poles in the acquired setting pseudo multipole information, a distance between the poles of the pseudo multipole being equal to or less than a predetermined distance.

3. The information processing device according to claim 1, wherein said seeking range setting code is configured to cause at least one of said at least one processor to set said seeking range in which the seeking code seeks for the pseudo multipole depending on the position of the pseudo multipole in the frame preceding the single frame in the reproduction direction of the video.

4. The information processing device according to claim 1, further comprising color information recommending code configured to cause at least one of said at least one processor to, in setting the setting pseudo multipole information, recommend color information on a remaining one of the poles when color information on a predetermined one of the poles has been set.

5. The information processing device according to claim 4, wherein
the color information recommending code is configured to cause at least one of said at least one processor to recommend the color information on the remaining pole on the basis of information concerning the object.

6. The information processing device according to claim 1, further comprising a-pseudo multipole recommending code configured to cause at least one of said at least one processor to, in setting the setting pseudo multipole information, recommend another pseudo multipole after the at least one pseudo multipole has been set.

7. The information processing device according to claim 1, wherein
the object tracking code is configured to cause at least one of said at least one processor to track the object on the basis of positions of the plurality of pseudo multipoles found.

8. The information processing device according to claim 1, wherein
the number of the poles of the pseudo multipole is three or more.

9. The information processing device according to claim 8, wherein
when the at least one of said at least one processor as instructed by the seeking code fails to seek all the poles of the pseudo multipole, the seeking code causes at least one of said at least one processor to find the pseudo multipole by estimating, from a found one of the poles, a position of another one of the poles, on the basis of a positional relationship between the poles.

10. The information processing device according to claim 1, wherein
the seeking code is configured to cause at least one of said at least one processor to seek for the pseudo multipole in which a color value in a point located between the poles is different from color values of all the poles by a predetermined value or more.

11. An information processing method performed by at least one computer processor, for tracking a predetermined object in a video having a plurality of frames, comprising:
acquiring setting pseudo multipole information on a pseudo multipole, the setting pseudo multipole information being set such that color information on poles is related to color information on the object, the poles corresponding to a plurality of points in an image of a single predetermined frame;
acquiring setting distance information in which distances between the poles of the pseudo multipole are set in a discrete manner;
specifying a position of the pseudo multipole in an initial frame;
seeking an image of a single frame in the video for the pseudo multipole, the pseudo multipole having poles whose colors conform to colors in the color information on the poles in the acquired setting pseudo multipole information, a distance between the poles of the pseudo multipole being equal to one of the distances in the acquired setting distance information;
specifying a position of the found pseudo multipole in the image of the single frame of the video;
tracking the object on the basis of the position of the pseudo multipole in the image of the single frame which has been specified and the position of the pseudo multipole in an image of a frame preceding the single frame in a reproduction direction of the video which has been specified; and
setting a seeking range that is larger than an identification range having a predetermined size which is used to specify the position of the object in the preceding frame.

12. A non-transitory recording medium computer-readably recording a computer program that tracks a predetermined object in a video having a plurality of frames, the program causing a computer to:
acquire setting pseudo multipole information on a pseudo multipole, the setting pseudo multipole information being set such that color information on poles is related to color information on the object, the poles corresponding to a plurality of points in an image of a single predetermined frame;
acquire setting distance information in which distances between the poles of the pseudo multipole are set in a discrete manner;
specify a position of the pseudo multipole in an initial frame;
seek an image of a single frame in the video for the pseudo multipole, the pseudo multipole having poles whose colors conform to colors in the color information on the poles in the acquired setting pseudo multipole information, a distance between the poles of the pseudo multipole being equal to one of the distances in the acquired setting distance information;
specify a position of the found pseudo multipole in the image of the single frame of the video;
track the object on the basis of the position of the pseudo multipole in the image of the single frame specified and the position of the pseudo multipole in an image of a frame preceding the single frame in a reproduction direction of the video; and
set a seeking range that is larger than an identification range having a predetermined size which is used to specify the position of the object in the preceding frame.

* * * * *